US009525509B2

(12) United States Patent
Kawahara et al.

(10) Patent No.: US 9,525,509 B2
(45) Date of Patent: Dec. 20, 2016

(54) DATA TRANSMISSION APPARATUS AND DATA TRANSMISSION METHOD

(71) Applicant: FUJITSU LIMITED, Kawasaki-shi (JP)

(72) Inventors: Hidetaka Kawahara, Shimotsuga (JP); Junichi Sugiyama, Oyama (JP); Wataru Odashima, Oyama (JP); Shota Shinohara, Kawasaki (JP); Hiroyuki Homma, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 272 days.

(21) Appl. No.: 13/781,959

(22) Filed: Mar. 1, 2013

(65) Prior Publication Data
US 2013/0259484 A1   Oct. 3, 2013

(30) Foreign Application Priority Data

Mar. 29, 2012   (JP) .................. 2012-077865

(51) Int. Cl.
*H04B 7/212*   (2006.01)
*H04J 14/08*   (2006.01)
*H04J 3/16*   (2006.01)

(52) U.S. Cl.
CPC ............. *H04J 14/08* (2013.01); *H04J 3/1652* (2013.01); *H04J 2203/0012* (2013.01); *H04J 2203/0025* (2013.01); *H04J 2203/0096* (2013.01)

(58) Field of Classification Search
CPC ........... H04J 14/00; H04J 3/1652; H04J 14/08
USPC ................. 370/535–541, 400–408
See application file for complete search history.

(56) References Cited

U.S. PATENT DOCUMENTS

| 7,257,117 | B2 * | 8/2007 | Roberts et al. ............... 370/392 |
| 2002/0176356 | A1 * | 11/2002 | Courtney ................ H04J 3/062 370/216 |
| 2005/0071594 | A1 * | 3/2005 | Jarabek .................... G11C 7/22 711/167 |
| 2007/0189336 | A1 * | 8/2007 | Zou .............................. 370/505 |

(Continued)

FOREIGN PATENT DOCUMENTS

| JP | 2011-055199 | 3/2011 |
| JP | 2011-146917 | 7/2011 |

(Continued)

OTHER PUBLICATIONS

JPOA—Office Action mailed on May 26, 2015 issued with respect to the basic Japanese Patent Application No. 2012-077865, with partial English translation.

*Primary Examiner* — Shaq Taha
(74) *Attorney, Agent, or Firm* — Fujitsu Patent Center

(57) ABSTRACT

A data transmission device where a low-speed signal transmission frame is included in time slots of a high-speed signal transmission frame and a number of the time slots to include the low-speed signal transmission frame is variable, wherein the time slots have respective time slot numbers, includes a storage unit storing signal data of the high-speed signal transmission frame corresponding to the number of the time slots based on a time slot number basis, wherein the signal data of the high-speed signal transmission frame are supplied on the time slot number basis; and a selection and output unit selecting and sequentially outputting the signal data on the time slot number basis, wherein the signal data have been stored in accordance with the number of the time slots.

6 Claims, 22 Drawing Sheets

(56) References Cited

U.S. PATENT DOCUMENTS

| | | | |
|---|---|---|---|
| 2007/0248121 A1* | 10/2007 | Zou | H04J 3/1611 |
| | | | 370/498 |
| 2010/0124417 A1* | 5/2010 | Kawaguchi | H04L 12/437 |
| | | | 398/3 |
| 2011/0170864 A1 | 7/2011 | Tani et al. | |
| 2013/0064555 A1 | 3/2013 | Kitajima et al. | |
| 2013/0216217 A1* | 8/2013 | Sharma | H04J 14/08 |
| | | | 398/8 |
| 2013/0315592 A1* | 11/2013 | Sharma | H04B 10/27 |
| | | | 398/58 |

FOREIGN PATENT DOCUMENTS

| | | |
|---|---|---|
| JP | 2012-004839 | 1/2012 |
| WO | 20101103018 A1 | 9/2010 |
| WO | 2011/151892 A1 | 12/2011 |

* cited by examiner

| | MSB bit7 | bit6 | bit5 | bit4 | bit3 | bit2 | bit1 | LSB bit0 | | |
|---|---|---|---|---|---|---|---|---|---|---|
| | | | | 1 ←8bit→ | | | | | | |
| | 1 | 2 | 3 | 4 | 5 | 6 | 7 | 8 | 9 | 768 |
| 1 | JC4 | JC1 | JC5 | JC2 | JC6 | JC3 | MSI | Reserve for ODTU-OH | Payload | |
| 2 | FAS | FAS | FAS | FAS | BIP-8 | Reserve for BWB Inf | | | Payload | |
| 3 | CI#1 | CI#2 | Reserve | | AF#1 | AF#2 | Reserve | | Payload | |
| 4 | Reserve:Don't Care | | | | | | | | Payload | |
| 5 | Reserve:Don't Care | | | | | | | | Payload | |
| 6 | Reserve:Don't Care | | | | | | | | Payload | |
| 7 | Reserve:Don't Care | | | | | | | | Payload | |
| 8 | Reserve or Payload (for ODU4 Transmit) | | | | | | | | Payload | |
| 9 | Reserve or Payload (for ODU4 Transmit) | | | | | | | | Payload | |
| 10 | Reserve or Payload (for ODU4 Transmit) | | | | | | | | Payload | |
| 11 | Reserve or Payload (for ODU4 Transmit) | | | | | | | | Payload | |
| 12 | Reserve or Payload (for ODU4 Transmit) | | | | | | | | Payload | |
| 13 | Reserve or Payload (for ODU4 Transmit) | | | | | | | | Payload | |
| 14 | Reserve or Payload (for ODU4 Transmit) | | | | | | | | Payload | |
| 15 | Reserve or Payload (for ODU4 Transmit) | | | | | | | | Payload | |
| 16 | Reserve or Payload (for ODU4 Transmit) | | | | | | | | Payload | |
| 17 | Reserve or Payload (for ODU4 Transmit) | | | | | | | | Payload | |
| 18 | Reserve or Payload (for ODU4 Transmit) | | | | | | | | Payload | |
| 19 | Reserve or Payload (for ODU4 Transmit) | | | | | | | | Payload | |
| 20 | Reserve or Payload (for ODU4 Transmit) | | | | | | | | Payload | |

FIG.8

| | ODU4 | ODU3 | ODU2 |
|---|---|---|---|
| 1TS | 80 | 32 | 8 |
| 2TS | 40 | 16 | 4 |
| 3TS | 26 | 10 | 2 |
| 4TS | 20 | 8 | 2 |
| 5TS | 16 | 6 | 1 |
| 6TS | 13 | 5 | 1 |
| 7TS | 11 | 4 | 1 |
| 8TS | 10 | 4 | 1 |
| 9TS | 9 | 3 | |
| 10TS | 8 | 3 | |
| 11TS | 7 | 2 | |
| 12TS | 6 | 2 | |
| 13TS | 6 | 2 | |
| 14TS | 5 | 2 | |
| 15TS | 5 | 2 | |
| 16TS | 5 | 2 | |
| 17TS | 4 | 1 | |
| 18TS | 4 | 1 | |
| 19TS | 4 | 1 | |
| 20TS | 4 | 1 | |
| 21TS | 3 | 1 | |
| 22TS | 3 | 1 | |
| 23TS | 3 | 1 | |
| 24TS | 3 | 1 | |
| 25TS | 3 | 1 | |
| 26TS | 3 | 1 | |
| 27TS | 2 | 1 | |
| 28TS | 2 | 1 | |
| 29TS | 2 | 1 | |
| 30TS | 2 | 1 | |
| 31TS | 2 | 1 | |
| 32TS | 2 | 1 | |
| 33TS | 2 | | |
| 34TS | 2 | | |
| 35TS | 2 | | |
| 36TS | 2 | | |
| 37TS | 2 | | |
| 38TS | 2 | | |
| 39TS | 2 | | |
| 40TS | 2 | | |
| 41TS | 1 | | |
| 42TS | 1 | | |
| 43TS | 1 | | |
| 44TS | 1 | | |
| 45TS | 1 | | |
| 46TS | 1 | | |
| 47TS | 1 | | |
| 48TS | 1 | | |
| 49TS | 1 | | |
| 50TS | 1 | | |
| 51TS | 1 | | |
| 52TS | 1 | | |
| 53TS | 1 | | |
| 54TS | 1 | | |
| 55TS | 1 | | |
| 56TS | 1 | | |
| 57TS | 1 | | |
| 58TS | 1 | | |
| 59TS | 1 | | |
| 60TS | 1 | | |
| 61TS | 1 | | |
| 62TS | 1 | | |
| 63TS | 1 | | |
| 64TS | 1 | | |
| 65TS | 1 | | |
| 66TS | 1 | | |
| 67TS | 1 | | |
| 68TS | 1 | | |
| 69TS | 1 | | |
| 70TS | 1 | | |
| 71TS | 1 | | |
| 72TS | 1 | | |
| 73TS | 1 | | |
| 74TS | 1 | | |
| 75TS | 1 | | |
| 76TS | 1 | | |
| 77TS | 1 | | |
| 78TS | 1 | | |
| 79TS | 1 | | |
| 80TS | 1 | | |
| Total | 369 | 119 | 20 |

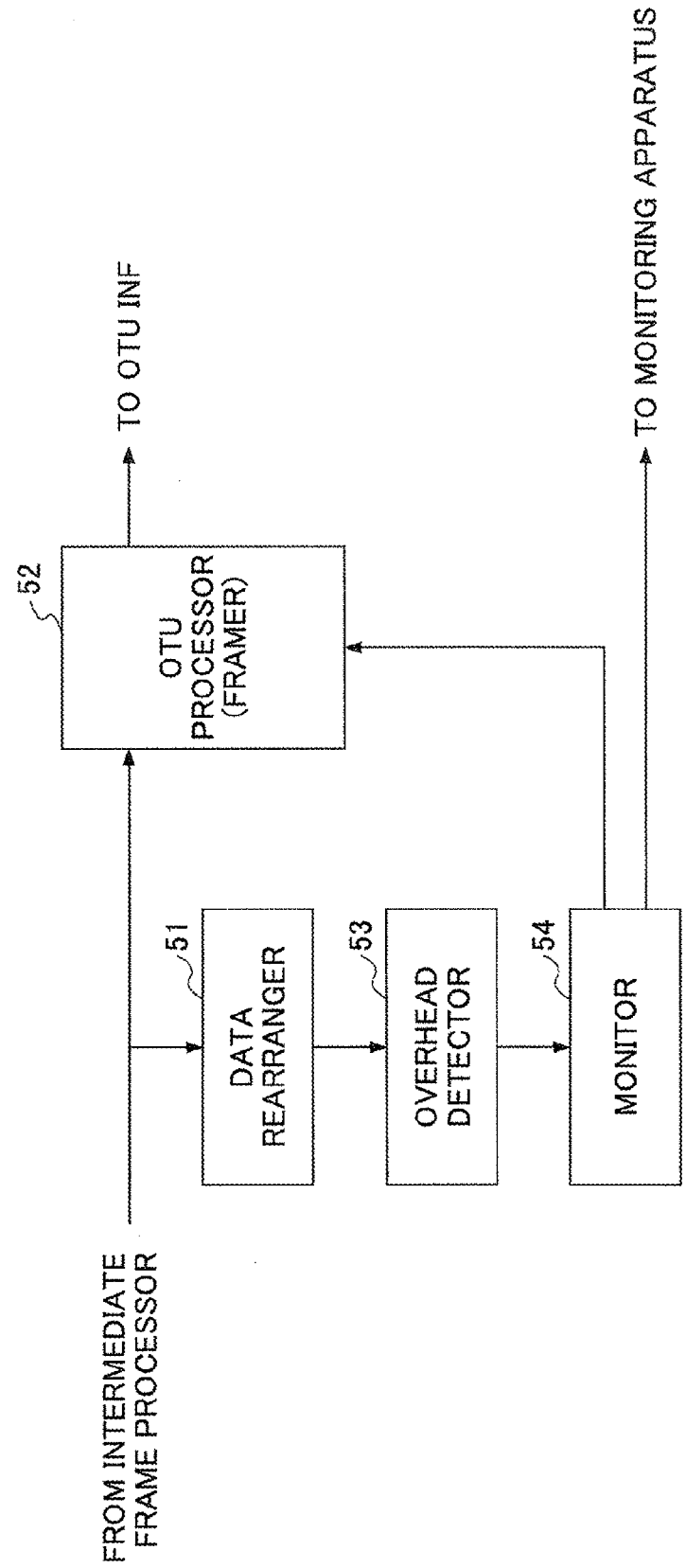

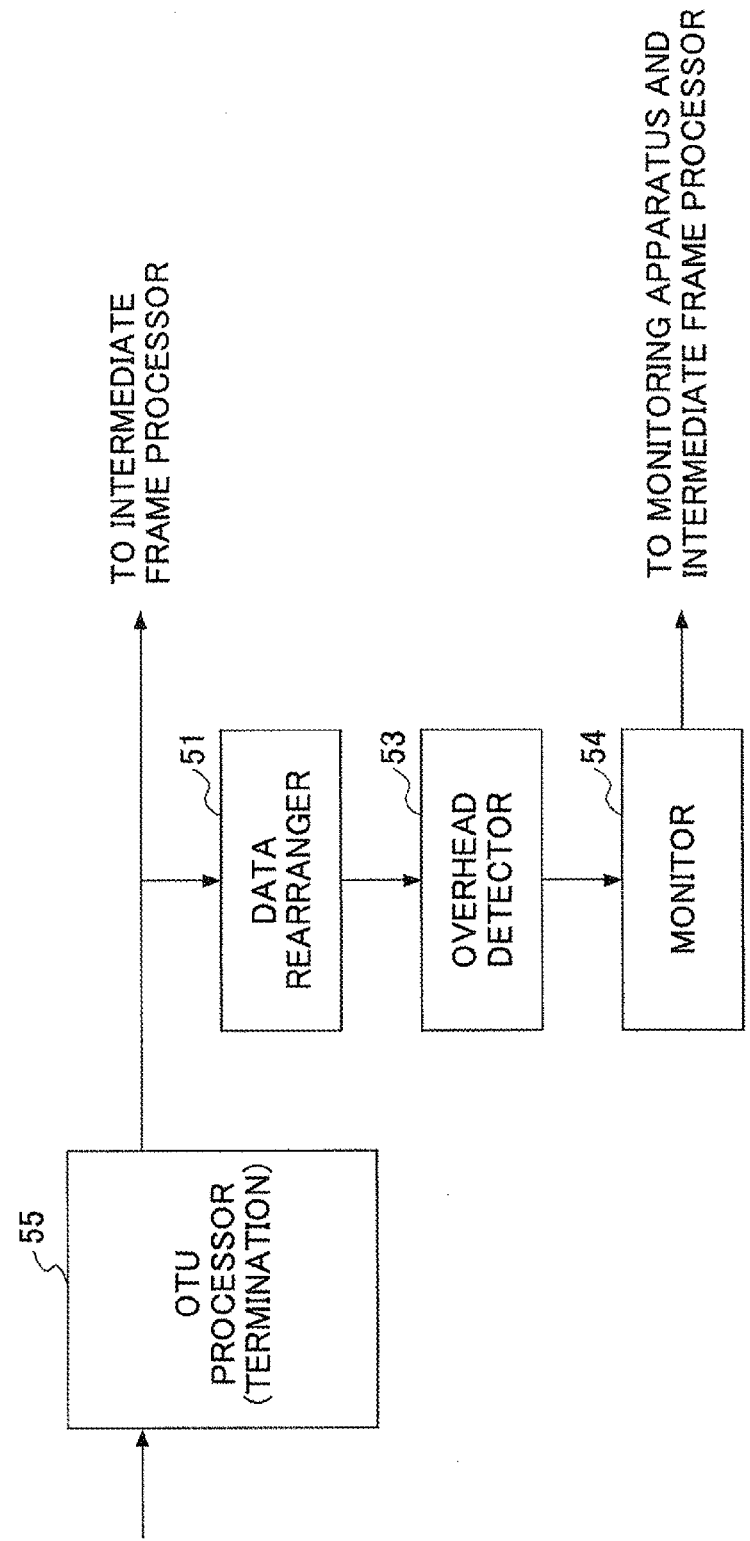

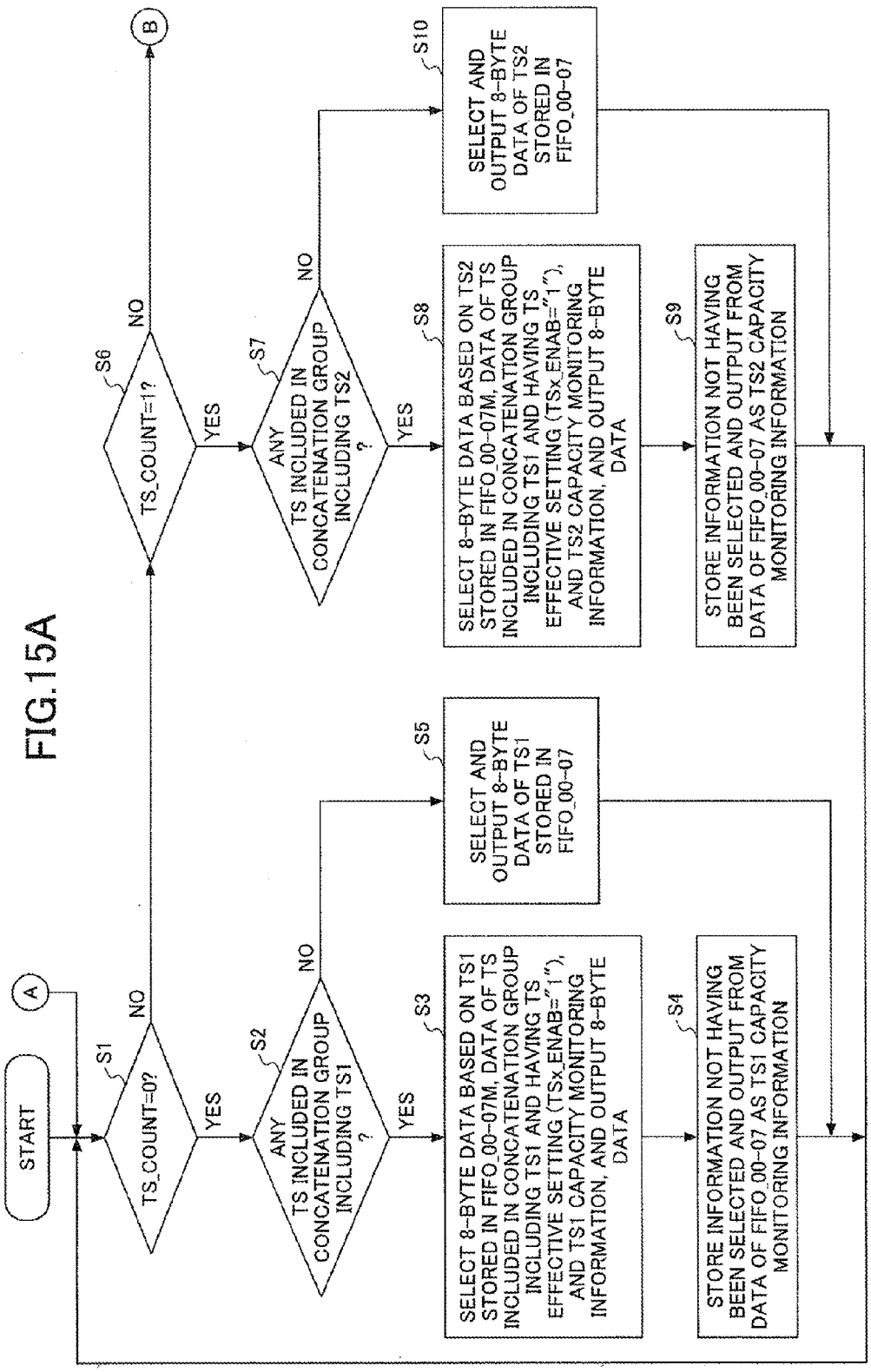

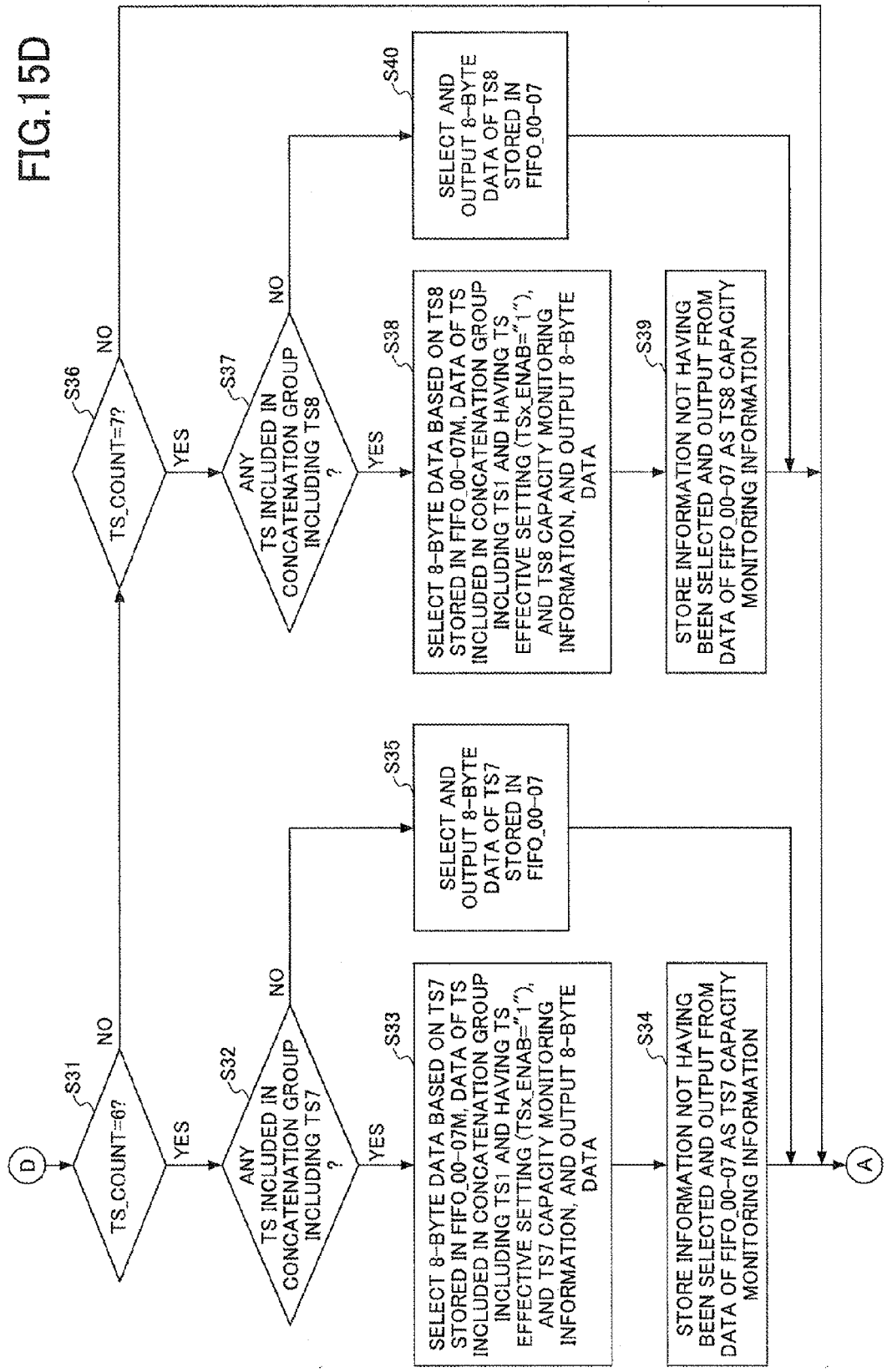

DATA TRANSMISSION APPARATUS AND DATA TRANSMISSION METHOD

CROSS-REFERENCE TO RELATED APPLICATIONS

This application is based upon and claims the benefit of priority of the prior Japanese Patent Application No. 2012-077865, filed on Mar. 29, 2012, the entire contents of which are incorporated herein by reference.

FIELD

The embodiment discussed herein is related to a data transmission device and a data transmission method for a network.

BACKGROUND

ITU-T recommends an OTN (Optical Transport Network) where packet data may be integrally handled as a next-generation optical transportation technique expected to be used in more application fields.

In the OTN, it is possible to integratively handle TDM-based data such as SONET (Synchronous Optical Network)/SDH (Synchronous Digital Hierarchy) and packet-based data in the Ethernet (registered trademark, and hereinafter may be simplified as a "LAN" (Local Area Network))

The OTN includes specifications of ODUflex (Optical Channel Data Unit flex) providing a variable bandwidth in response to a demand to effectively transmit packet-based data which are currently main traffic data.

As described, in the data transmission based on the OTN, by providing the variable bandwidth in response to a demand, it becomes possible to effectively transmit the packet-based data.

Specifically, there is a known technique where to effectively transmit the packet-based data, the correspondence between a tributary slot in a frame signal and a client signal is managed, and based on the correspondence, a demapping process from the frame signal to the client signal is performed. Reference may be made to Japanese Laid-open Patent Publication No. 2011-55199.

SUMMARY

According to an aspect, a data transmission device where a low-speed signal transmission frame is included in time slots of a high-speed signal transmission frame and a number of the time slots to include the low-speed signal transmission frame is variable, wherein the time slots have respective time slot numbers, includes a storage unit storing signal data of the high-speed signal transmission frame corresponding to the number of the time slots based on a time slot number basis, wherein the signal data of the high-speed signal transmission frame are supplied on the time slot number basis; and a selection and output unit selecting and sequentially outputting the signal data on the time slot number basis, wherein the signal data have been stored in accordance with the number of the time slots.

The objects and advantages of the embodiments disclosed herein will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 3 illustrates an example frame format of an ODU-flex;

FIG. 4 illustrates an example frame format of an intermediate frame according to an embodiment;

FIG. 8 illustrates an example number of the overhead detectors and the sum value of the number of the overhead detectors;

FIGS. 9A and 9B illustrate an example configuration of an ODU processor;

FIGS. 15A through 15D illustrate an example flowchart of operations of a data selector.

DESCRIPTION OF EMBODIMENT

In the following, embodiments are described with reference to the accompanying drawings.

Figure 1:
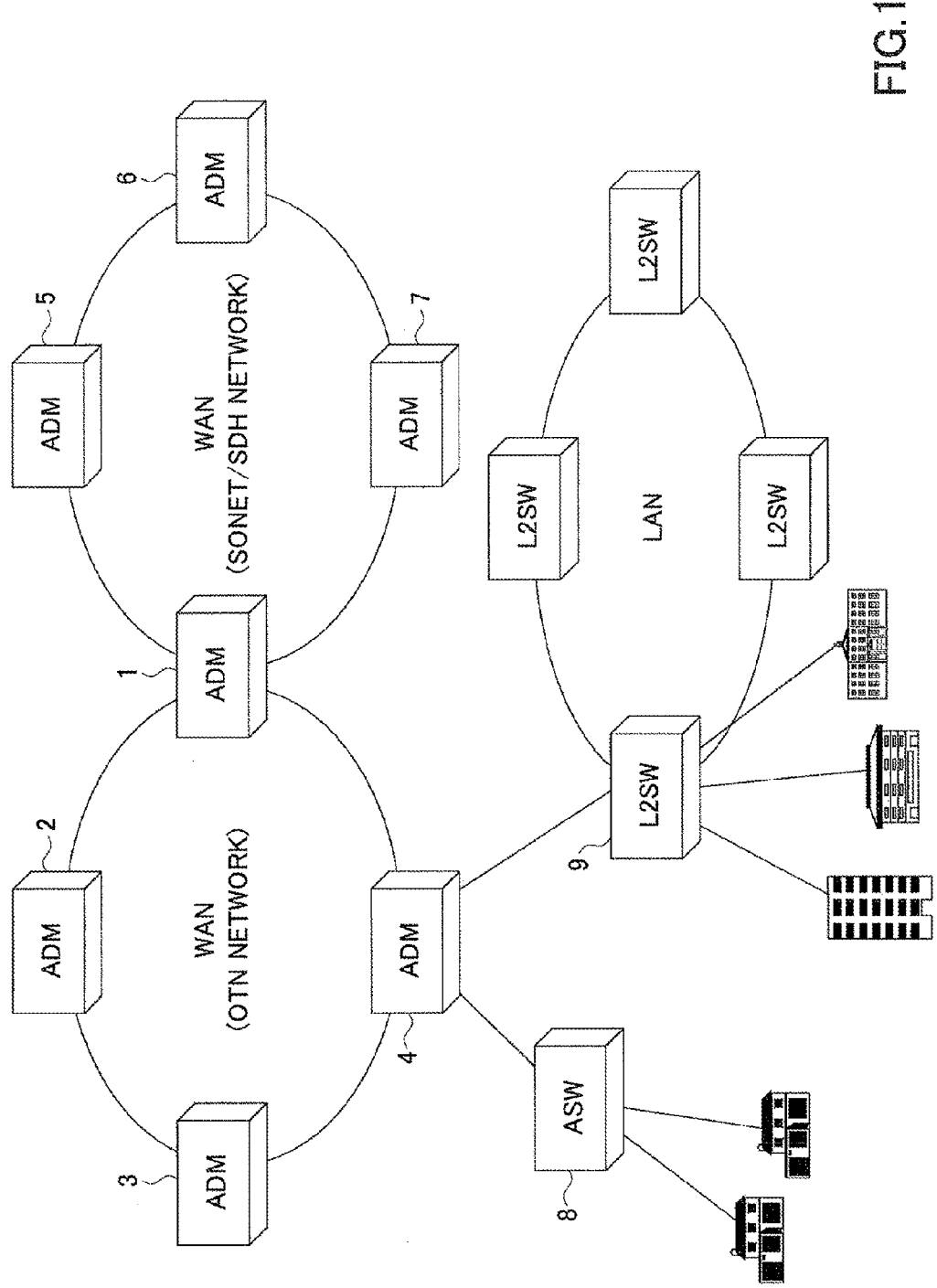
FIG. 1 illustrates an example configuration of a network system.

FIG. 1 illustrates an example configuration a network system. As illustrated in FIG. 1, an ADM (Add Drop Multiplexer) apparatus 1 along with other ADM apparatuses 2, 3, and 4 forms an OTN (Optical Transport Network) network (a.k.a. WAN (Wide Area Network)).

Also, the ADM apparatus 1 along with other ADM apparatuses 5, 6, and 7 forms a SONET (Synchronous Optical Network) or an SDH (Synchronous Digital Hierarchy) network. Further, the ADM apparatus 4 is connected to an ASW (Aggregate SWitch) apparatus 8 and an L2SW (Layer 2 SWitch) apparatus 9 which is included in (forms) an LAN (Local Area Network) based on the Ethernet (registered trademark) network.

The ADM apparatus 1 communicates in the OTN network by inserting a CBR (Constant Bit Rate) signal of the SONET, the SDH or the like into an OTN frame based on BMP (Bit-synchronous Mapping Procedure) mapping. Further, the ADM apparatus 1 demaps the OTN frame to obtain the SONET signal, and transmits the SONET signal to the SONET network.

The OTN specifies an ODUflex (Optical Channel Data Unit flex) that may provide a variable bandwidth in response to a demand to effectively transmit packet-based data which are currently considered as main traffic.

Figure 2:
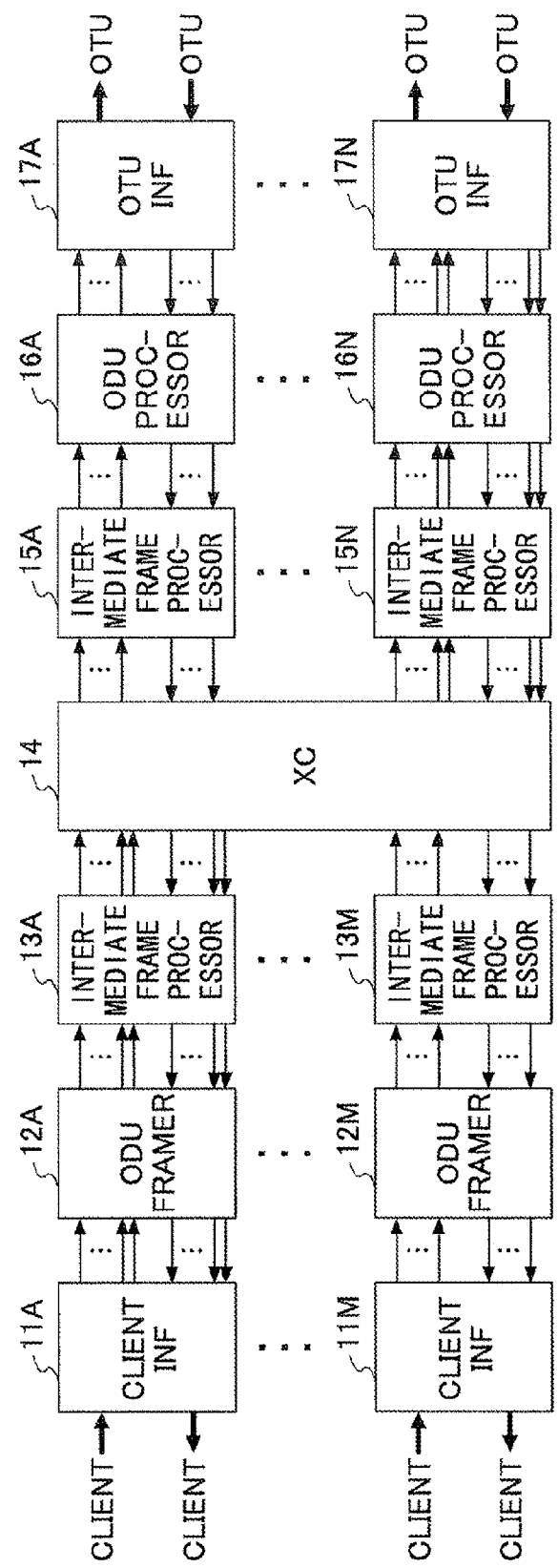
FIG. 2 illustrates an example configuration of an ADM apparatus in an OTN network.

FIG. 2 illustrates an example configuration of the ADM apparatus in the OTN network. As illustrated in FIG. 2, client interfaces 11A through 11M receive a client signal such as a LAN signal (10GbE) and a SONET signal from a client.

The received client signal is mapped to an LO_ODU (Lower Order ODU) or an LO_ODUflex (Lower Order ODUflex) in ODU framers 12A through 12M. Further, the received client signal is converted into an intermediate frame in intermediate frame processors 13A through 13M. Then, the intermediate frame is supplied to an ODU cross connector 14 to be cross-connected.

Further, the intermediate frame processors 13A through 13M convert the intermediate frame supplied from the ODU cross connector 14 into an LO ODU frame or an LO_ODUflex frame. The converted LO_ODU frame or the LO_ODUflex frame is demapped to the client signal such as the LAN signal or the SONET signal. The demapped client signal is transmitted to the client from the client interfaces 11A through 11M.

The intermediate frame cross-connected by the ODU cross connector 14 is supplied to intermediate frame processors 15A through 15N on the network side, and is converted into the LO_ODU frame or the LO_ODUflex frame. The LO_ODU frame or the LO_ODUflex frame is supplied to ODU processors 16A through 16N to be multiplexed and mapped to an HO_ODU (Higher Order ODU).

Further, an overhead and an FEC described below are added to obtain an HO_OTU (Higher Order Optical channel Transport Unit) frame. The HO_OTU frame is transmitted to the OTN network via OTU interfaces 17A through 17N. Herein, the LO_ODUflex frame and the LO_ODU frame may also be called a "low-speed signal transmission frame", and the HO_ODU frame may also be called a "high-speed signal transmission frame".

Further, the OTU interfaces 17A through 17N receives the HO_OTU frame from the OTN network and supplies the HO_OTU frame to the ODU processors 16A through 16N. The ODU processors 16A through 16N demultiplex the HO_OTU frame to obtain the LO_ODU frame or the LO_ODUflex frame, and supplies the LO_ODU frame or the LO_ODUflex frame to the intermediate frame processors 15A through 15N.

Figure 3:
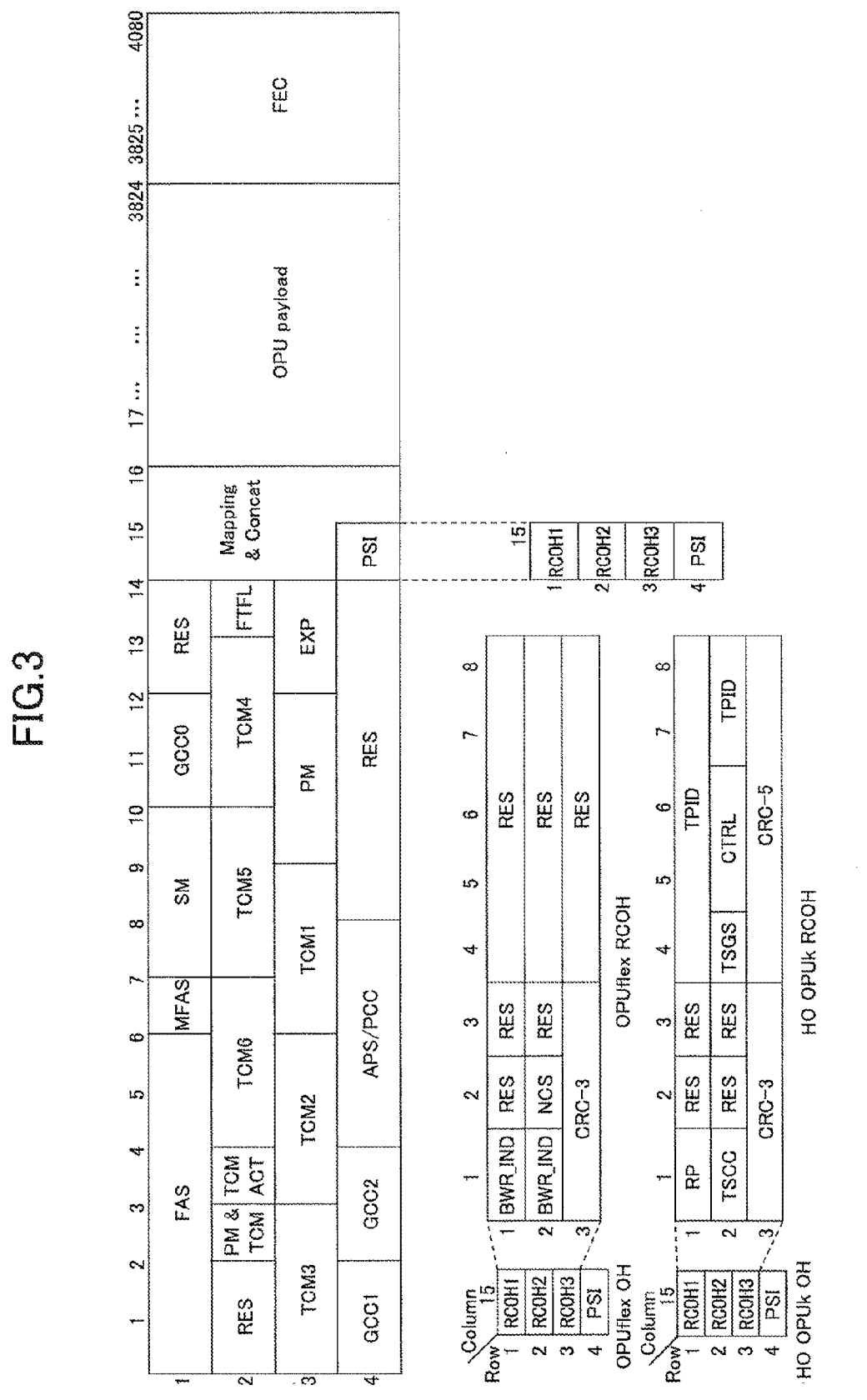

The intermediate frame processors 15A through 15N convert the LO_ODU frame or the LO_ODUflex frame into the intermediate frame. Then, the intermediate frame is supplied to the ODU cross connector 14 to be cross-connected. Frame format FIG. 3 illustrates an example frame format of OTUk (Optical channel Transport Unit k, where k denotes a zero or positive integer). The OTUk frame includes an overhead section, an OPU (Optical channel Payload Unit), a payload section, and an FEC (Forward Error Correction) section.

The overhead section has a size of 16 columns (1 through 16) by 4 rows and is used for management of connection (connectivity) and quality. Specifically, a part of seven columns (from the first column to the seventh column) by one row (the first row only) corresponds to an FA (Frame Alignment) overhead.

A part of seven columns (from the eighth column to the fourteenth column) by one row (the first row only) corresponds to an OTU overhead. A part of 14 columns (from the first column to the fourteenth column) by three rows (from the second row to the fourth rows) corresponds to an ODU overhead.

A part of two columns (from the fifteenth column to the sixteenth column) by four rows (from the first row to the fourth row) corresponds to an OPU overhead (a mapping unit and a controller). A part of one column (the fifteenth column only) by four rows (from the first row to the fourth row) corresponds to an OPUflex overhead (a mapping unit and a controller).

A part of one column (the fifteenth column only) by four rows (from the first row to the fourth row) corresponds to an OPUflex overhead (a mapping unit and a controller). The OPU payload has a size of columns from the 17th column to the 3824th to be 3808 bytes by four rows. The FEC section has a size of columns from 3the 825th to the 4080th to be 256 bytes by four rows, and is used for correcting an error occurred during the transmission.

Further, herein, an ODUk (Optical channel Data Unit k) refers to an OPUk payload section to which overhead bytes used for management of the connection and the quality. Further, the OTUk herein refers to the ODUk to which overhead bytes used for frame synchronization, the management of the connection and the quality and the like and an OTUkFEC overhead section are added. The file format of the ODUflex is the same as the ODU format.

Here, the multiplex insertion of the ODUflex frame into the HO_ODUk is realized by defining Tributary Slots (TSs) which are time slots formed by dividing an OPUk (Optical channel Payload Unit k) payload area which is a payload part of the HO_ODUk frame into "ts" Tributary Slots (TS) by the bytes, and inserting the ODUk into TSs of the payload area of the HO_ODUk frame.

ITU-T G.709 recommendations define two types of Tributary Slots (TSs) having approximately 1.25 Gbps and 2.5 Gbps, respectively, bandwidths per TS. In a case where the bandwidth per Tributary Slot (TS) is 1.25 Gbps, a tributary slot capacity "ts" is defined as "2" (ts=2) for the HO_ODU1, "8" (ts=8) for the HO_ODU2, "32" (ts=32) for the HO_ODU3, and "80" (ts=80) for the HO_ODU4.

Further, the tributary slot may also be called "time slot", the tributary slot capacity "ts" may also be called "time slot capacity", and the TS number identifying the tributary slot may also be called the "time slot number".

The bandwidth of the ODUflex is executed on a TS basis. The increase/decrease of the TS is controlled by using RCOH1 (Resize Control overhead), RCOH2, and RCOH3 of the HO_OPUk overhead. In FIG. 3, the "RP" of the PCOH1 in the HO_OPUk overhead denotes a "Resizing Protocol". The "TPID (Tributary Port ID)" of the RCOH1 and the RCOH2 denotes the tributary slot number of the tributary slot to be increased/decreased.

The "TSGS (Tributary Slot Group Status)" of the RCOH2 indicates a response to start the increase/decrease the bandwidth of the ODUflex. The "CTRL (ConTRoL)" of the RCOH2 indicates the control of an increase/decrease status of the TS. The "TSCC (Tributary Slot Connectivity Check)" indicates a state where the bandwidth of the ODUflex is changed.

FIG. 4 illustrates an example frame format of the intermediate frame according to an embodiment. A part of three rows (from the first row to the third row) by eight columns (from the first column to the eighth column) is used as an overhead region where JC1 (Justification overhead) through JC6, FAS (Frame Alignment overhead), BIP-8 (Bit Interleaved Parity-8), CI (Concatenate Indication), and AF (Alarm flag) are set.

The "Reserve" is not in use (reserve region). A part of the rows (from the fourth row to the seventh row) by the columns (from the first column to the eighth column) is the "reserve" region. A part of the rows (from the eighth row to the twentieth row) by the columns (from the first column to the eighth column) is the reserve region for the ODU3 and the like other than the ODU4 as the input signal, and is the payload region for the ODU4.

Further, a part of the rows (from the first row to the twentieth row) by the columns (from the ninth column to the 768th column) is the payload region. The intermediate frame according to an embodiment is generated so as to have an enough size to include the ODU0.

In a case where the OTU2 frame or the like is transmitted in the OTN network, the ODU processors 16A through 16N in FIG. 2 monitor the overhead of the ODUflex, the ODU0, and the ODU1 included in the signals from the intermediate frame processors 15A through 15N, respectively, and at the transmission rate of the ODU2.

When error information and the like is detected in the overhead, an alarm is reported to an upper monitoring apparatus, and the alarm information may be added to the overhead of the OTU2 frame to be transmitted to the network.

Further, the ODU processors 16A through 16N monitor the overhead of the ODUflex, the ODU0, and the ODU1 demultiplexed from the HO_OTU frame from the OTN network. When error information and the like is detected in the overhead, an alarm is reported to the upper monitoring apparatus, and the alarm information may be added to the overhead of the ODUflex, the ODU0, and the ODU1 to be transmitted to the network.

Figure 5A:
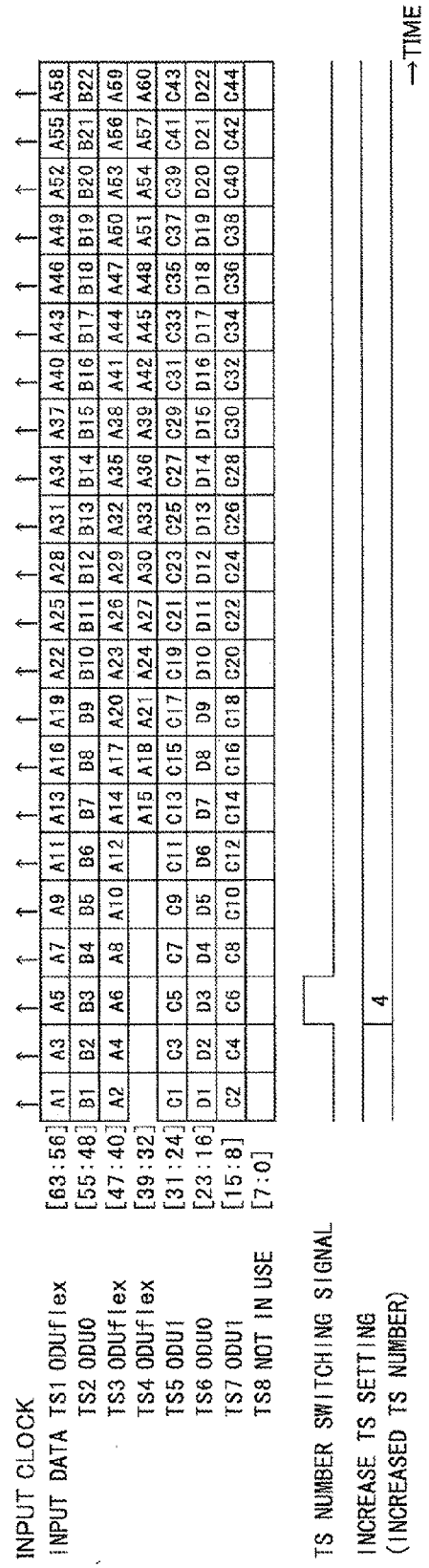
FIGS. 5A and 5B illustrate an example transmission rate signal of an ODU2.
Figure 5B:
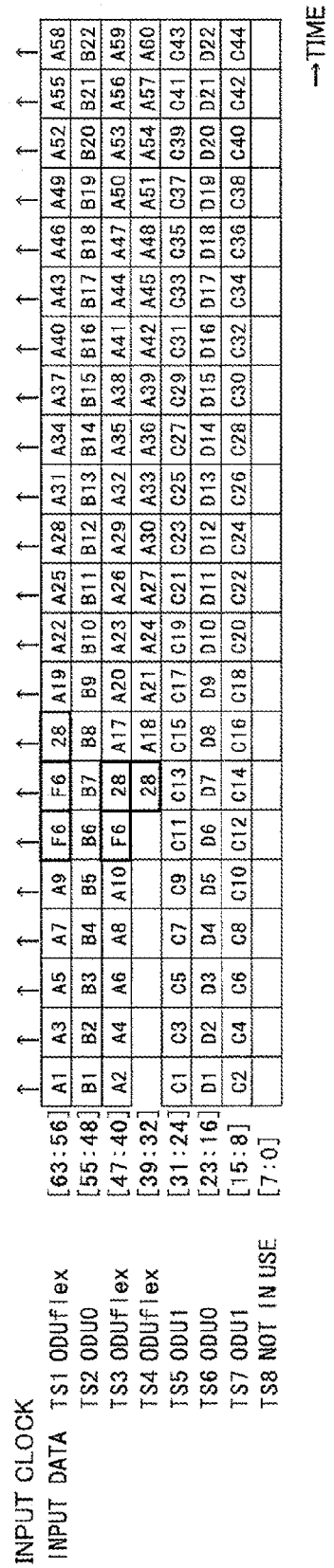

FIGS. 5A and 5B illustrate an example signal supplied from the intermediate frame processors 15A to the ODU processors 16A at a transmission rate of the ODU2. In FIG. 5A, the "TS1" (corresponding to data [63:56]), the "TS3" (corresponding to data [47:40]), and the "TS4" (corresponding to data [39:32]) constitute the ODUflex. For example, the "[63:56]" of data denotes the bits 56 through 63.

Further, TS2 is used in the ODU0. TS5 and TS7 constitute the ODU1. The TS6 is used in the ODU0. TS8 is not in use. Further, the ODUflex first uses the TS1 and TS3, and then additionally use the TS4 after four clocks since the input of a TS switching signal having a value of "1".

FIG. 5B illustrates a case where a fixed pattern "0xF6", "0xF6", "0xF6", "0x28", "0x28", and "0x28" of the FAS of FIG. 3 appears at the timing of adding the TS4 for the ODUflex.

In a case where the ODUflex enabling free frequency width change (hereinafter may also be referred to as "Resizing") on the TS basis (by the TS) is used, when the ODU overhead in the Resizing is to be detected, it is desired to detect (1) TS switching information, (2) the TS increase/decrease information, (3) concatenation information of input data, and (4) the FASs of the ODUflex, the ODU0, and the ODU1 included in the ODU2 frame.

Example Configuration of Overhead Detector

Figure 6:
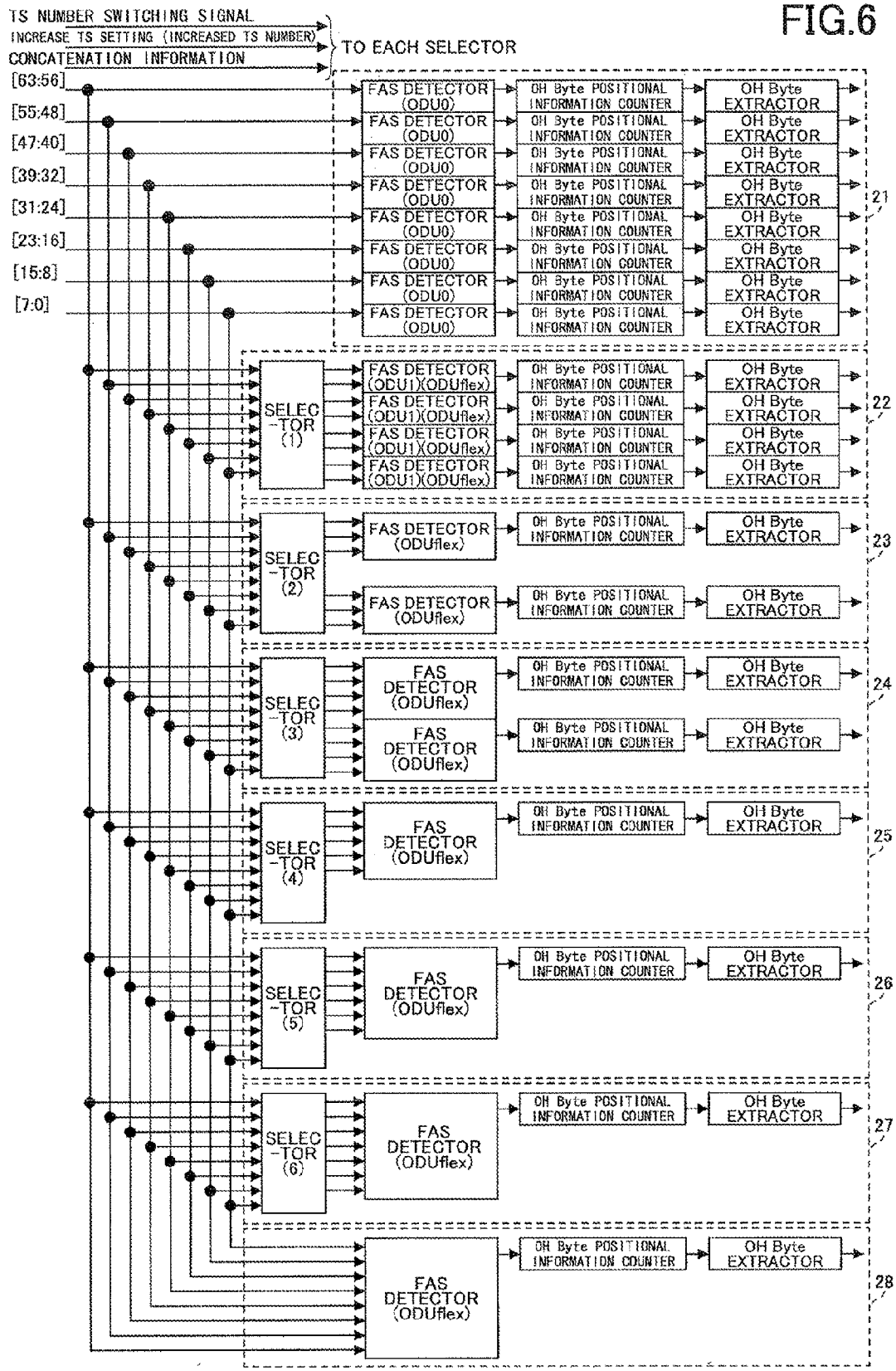
FIG. 6 illustrates an example configuration of an overhead detector.

FIG. 6 illustrates an example configuration of an overhead detector. In the configuration of FIG. 6, the signal having the transmission rate of the ODU2 of FIGS. 5A and 5B is input. A detection block 21 includes 8 circuits for corresponding TSs from TS1 to TS8, each of the circuits including a FAS detector to detect the FAS of the ODU0, an overhead positional information counter, and an overhead byte extractor for the TS1 through the TS8.

A detection block 22 includes a selector to select 2TS from the TS1 through TS8, FAS detectors to detect the FAS of the ODU1 or the ODUflex from the 2TS, overhead positional information counters, and overhead byte extractors.

A detection block 23 includes a selector to select 3TS from the TS1 through TS8, FAS detectors to detect the FAS of the ODUflex from the 3TS, overhead positional information counters, and overhead byte extractors.

A detection block 24 includes a selector to select 4TS from the TS1 through TS8, FAS detectors to detect the FAS of the ODUflex from the 4TS, overhead positional information counters, and overhead byte extractors.

A detection block 25 includes a selector to select 5TS from the TS1 through TS8, a FAS detector to detect the FAS of the ODUflex from the 5TS, an overhead positional information counter, and an overhead byte extractor.

A detection block 26 includes a selector to select 6TS from the TS1 through TS8, a FAS detector to detect the FAS of the ODUflex from the 6TS, an overhead positional information counter, and an overhead byte extractor.

A detection block 27 includes a selector to select 7TS from the TS1 through TS8, a FAS detector to detect the FAS of the ODUflex from the 7TS, an overhead positional information counter, and an overhead byte extractor.

A detection block 28 includes a FAS detector to detect the FAS of the ODUflex or the ODU2 from the TS1 through TS8, an overhead positional information counter, and an overhead byte extractor.

In the overhead detector of FIG. 6, when a signal at the transmission rate of the ODU2 is supplied, only a limited part of the detection block 21 is used. Namely, the overhead detectors may not be efficiently (fully) used.

Another Example Configuration of Overhead Detector

Figure 7:
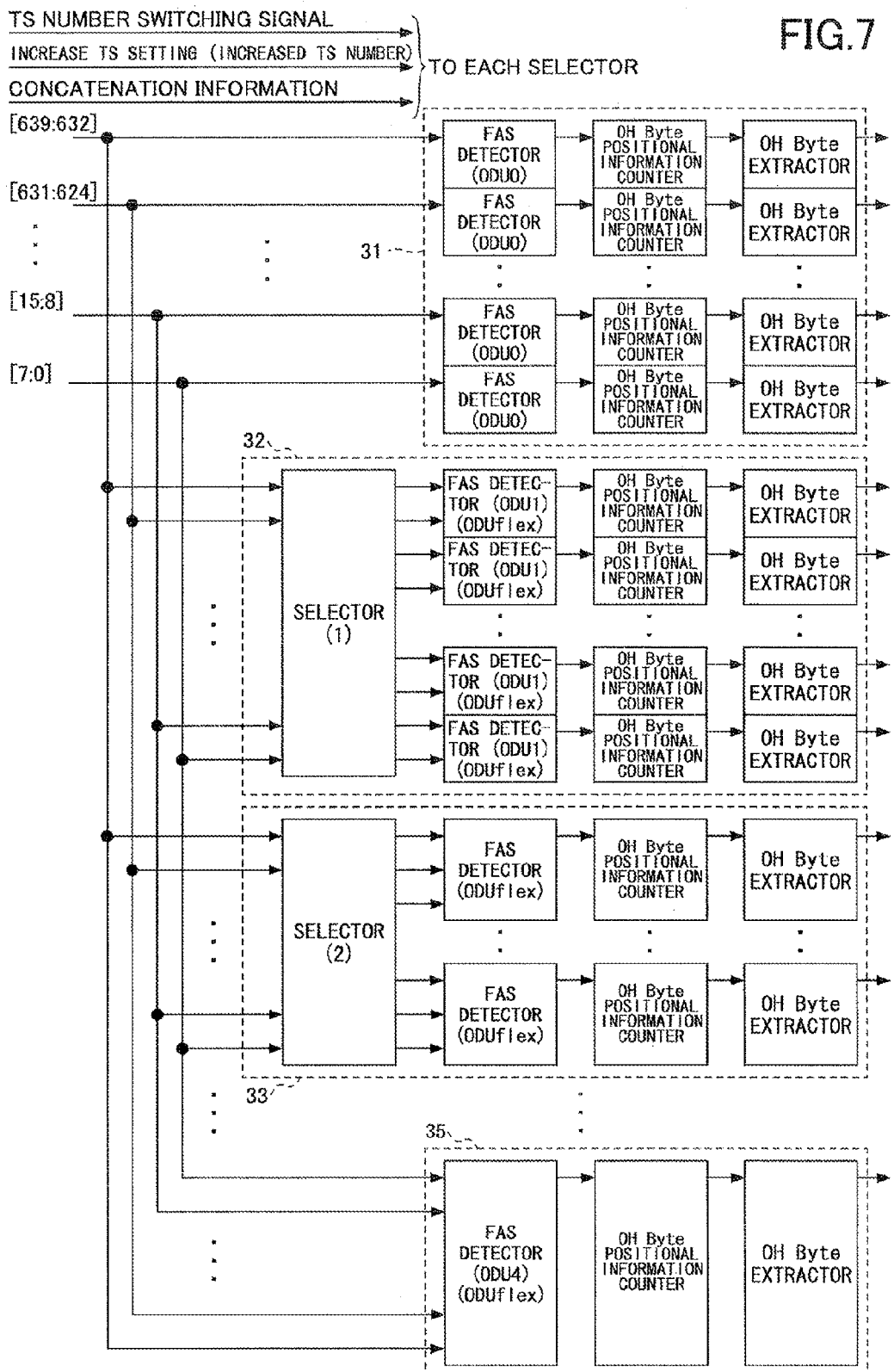
FIG. 7 illustrates another example configuration of an overhead detector.

FIG. 7 illustrates another example configuration of the overhead detector. In FIG. 7, a signal where the "ts" value is 80 at the transmission rate of the ODU4 is input.

A detection block 31 includes 80 circuits for corresponding TSs from TS1 to TS80, each of the circuits including a FAS detector to detect the FAS of the ODU0, an overhead positional information counter, and an overhead byte extractor.

A detection block 32 includes a selector to select 2TS from the TS1 through TS80 and 40 circuits, each of the circuits including a FAS detector to detect the FAS of the ODU1 or the ODUflex from the 2TS, an overhead positional information counter, and an overhead byte extractor.

A detection block 33 includes a selector to select 3TS from the TS1 through TS80 and 26 circuits, each of the circuits including a FAS detector to detect the FAS of the ODUflex from the 3TS, an overhead positional information counter, and an overhead byte extractor.

In the same manner, a detection block 35 includes a FAS detector to detect the FAS of the ODUflex or the ODU4 from the TS1 through TS80, an overhead positional information counter, and an overhead byte extractor.

FIG. 8 illustrates the number of overhead detectors (circuits) for each of the TSs from TS1 through TS80 and the sum of the numbers in cases of the ODU4, the ODU3, and the ODU2. As illustrated in FIG. 8, the sum of the circuits in ODU2 is 20, but the sum of the circuits in ODU4 is 369.

Therefore, a large number of circuits may be required, so that the energy consumption may be greatly increased.

Embodiment, Configuration of ODU Processor

FIGS. 9A and 9B illustrate an example configuration of the ODU processors 16A through 16N. More specifically, FIG. 9A illustrates a multiplexing-side processor inputting a signal from the intermediate frame processor at the transmission rate of the ODU2 and outputting an OTU frame.

FIG. 9B illustrates a demultiplexing-side processor inputting the OTU frame from an OTU interface and outputting the signal at the transmission rate of the ODU2.

In FIG. 9A, the signal from the intermediate frame processor at the transmission rate of the ODU2 is supplied to a data rearranger 51 and an OTU processor 52.

The data rearranger 51 rearranges the data of the signal at the transmission rate of the ODU2 between horizontal and vertical directions, and supplied the rearranged signal to an overhead detector 53. The overhead detector 53 detects the overheads of the ODU0, the ODU1, and the ODUflex, and outputs the detected headers to a monitor 54.

The monitor 54 monitors the overheads of the ODU0, the ODU1, and the ODUflex, so that the monitor 54 issues an alarm when error information is detected and reports the error information to the upper monitoring apparatus.

The monitor 54 further reports the error information to the OTU processor 52. The OTU processor 52 maps the signal at the transmission rate of the ODU2 to an HO_ODU2 frame and appends the overhead, the FEC and the like to the HO_ODU2 to generate an HO_OTU2 frame. The error information from the monitor 54 is set (inserted) in the overhead of the HO_OTU2 frame.

In FIG. 9B, the HO_OTU2 frame from the OTU interface is supplied to an OTU processor 55. The OTU processor 55 terminates the HO_OTU2 frame, extracts the HO_ODU2 frame, and supplies the signal at the transmission rate of the ODU2 to the data rearranger 51 and the intermediate frame processor.

The data rearranger 51 rearranges the signal at the transmission rate of the ODU2 between horizontal and vertical directions, and outputs the rearranged signal to the overhead detector 53.

The overhead detector 53 detects the overheads of the ODU0, the ODU1, and the ODUflex, and outputs the detected headers to a monitor 54. The monitor 54 monitors the overheads of the ODU0, the ODU1, and the ODUflex, so that the monitor 54 issues the alarm when error information is detected and reports the error information to the upper monitoring apparatus.

The monitor 54 further reports the error information to the following intermediate frame processor. Further, the data rearranger 51, the overhead detector 53, and the monitor 54 may be integrally or separately provided.

In this embodiment, data processing is performed by the configuration of data. To that end, the arrangement of data is rearranged (converted) by the data rearranger 51, and after that, the overhead byte is detected.

Configuration of Data Rearranger and Overhead Detector

Figure 10:
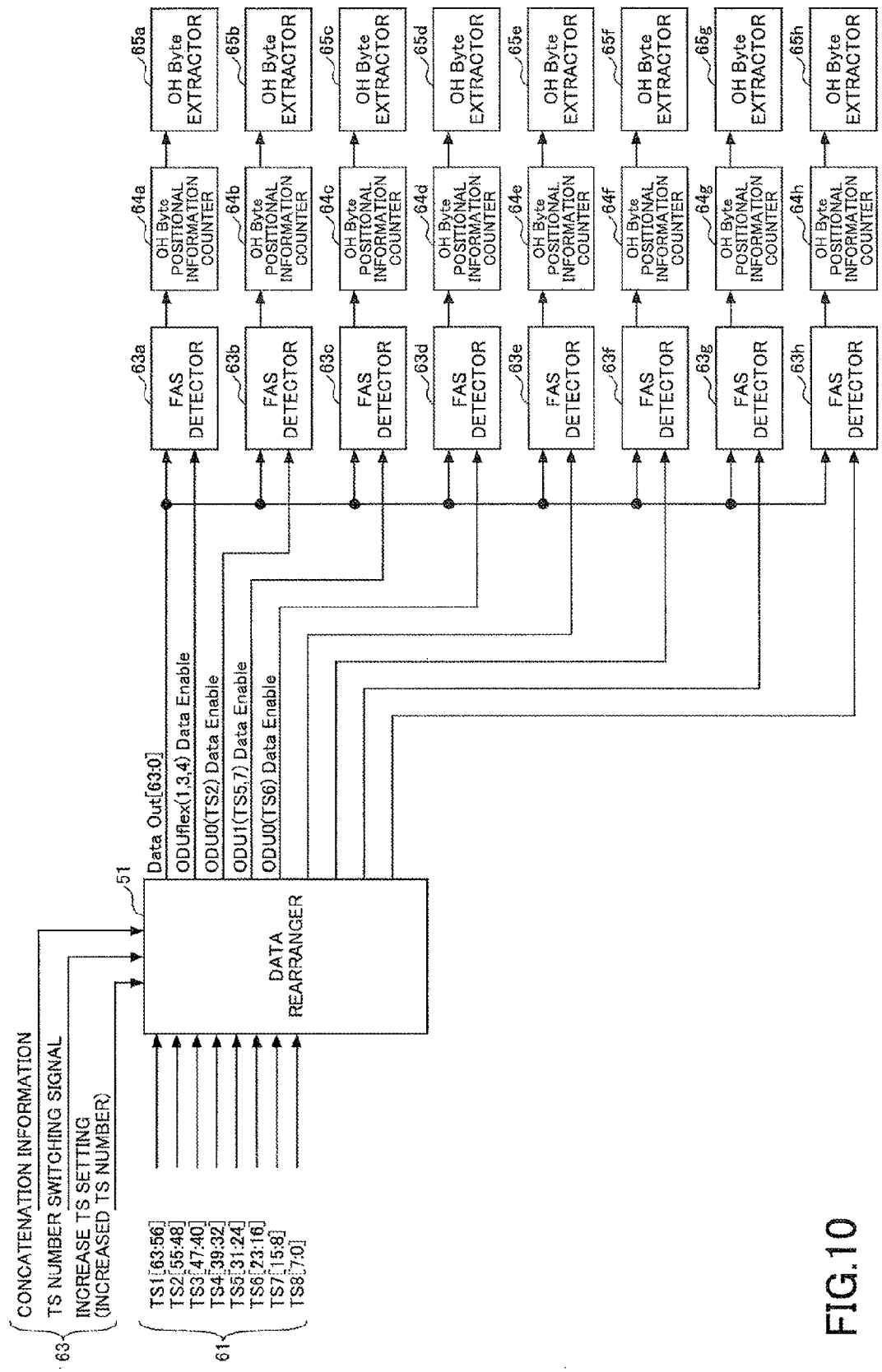
FIG. 10 illustrates an example configuration of the overhead detector according to an embodiment.

FIG. 10 illustrates an example configuration of an overhead detection apparatus including the data rearranger 51 and the overhead detector 53 according to an embodiment. As illustrated in FIG. 10, signals at the transmission rate of the ODU2 are input through the terminals 61 and into the data rearranger 51.

The signal at the transmission rate of the ODU2 has 64 bits (i.e., TS1[63:56] through TS8[7:0]). Further, the concatenation information, a TS switching signal, and a TS increase setting indicating the RS number of the increased TS are input through the terminals 63 and into the data rearranger 51.

Figure 11A:
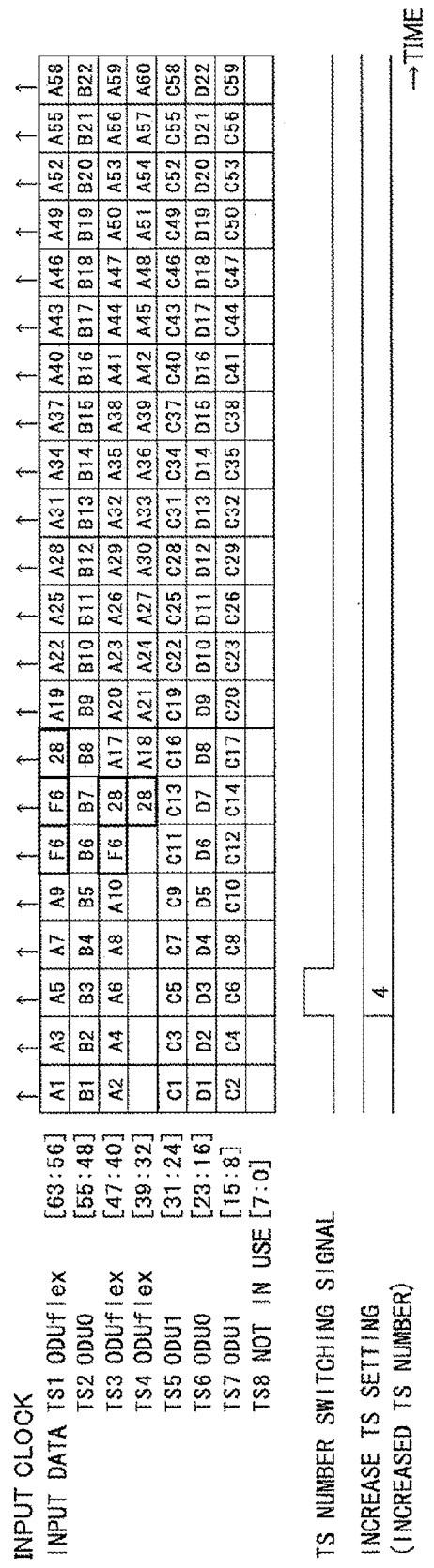
FIGS. 11A and 11B illustrate an example input/output signal of data and a converter.

FIG. 11A illustrates an example signal at the transmission rate of the ODU2 to be supplied to the data rearranger 51.

As illustrated in FIG. 11A, the tributary slot numbers TS1 (corresponding to data [63:56]), TS3 (corresponding to data [47:40]), and TS4 (corresponding to data [39:32]) are used for (constitute) the ODUflex.

Further, the tributary slot number TS2 is used for the ODU0. The tributary slot numbers TS5 and TS7 are used for the ODU1. The tributary slot number TS6 is used for the ODU0. The tributary slot number TS8 is not in use.

Further, the ODUflex uses the TS1 and the TS3 first. Then, after four clocks from the input of the TS switching signal, the TS4 which is designated by the TS increase setting is additionally used.

Figure 11B:
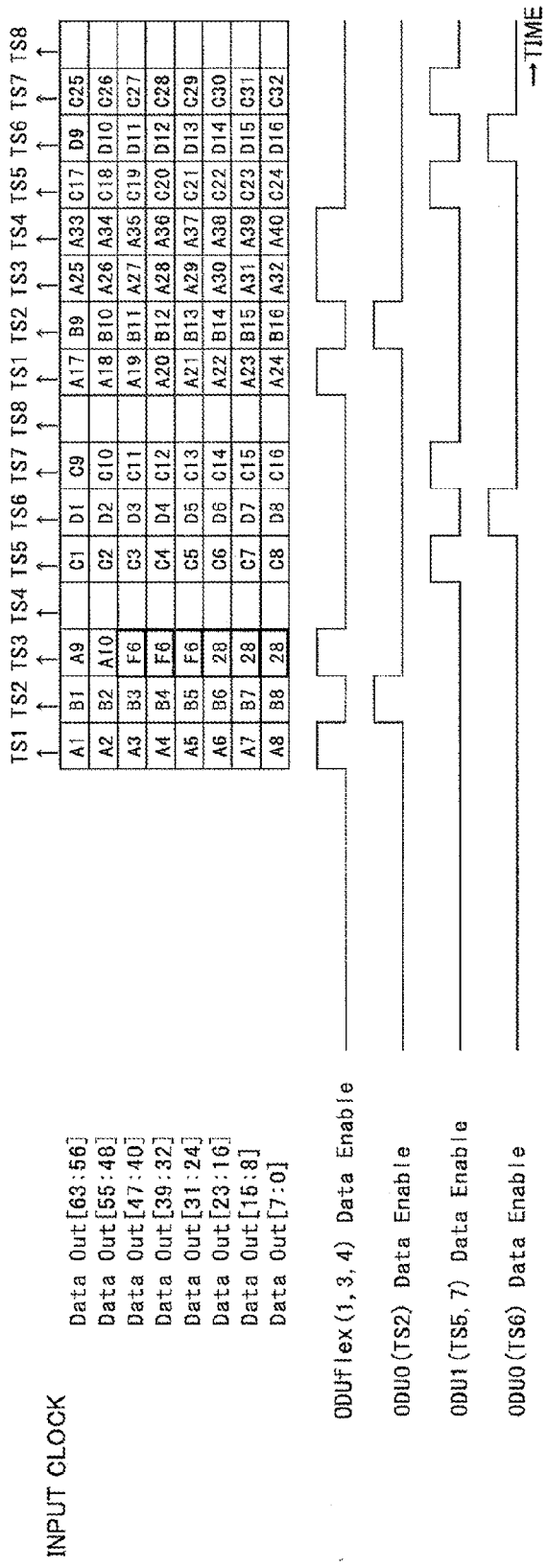

The data rearranger 51 rearranges the data of the signal at the transmission rate of the ODU2 between horizontal and vertical directions. By the rearrangement, as illustrated in FIG. 11B, the data having 64 bits, [63:56], [55:48], [47:40], [39:32], [31:24], [23:16], [15:8], [7:0], where the TS1 through TS8 are arranged in the time axis direction are output.

Along with the above, data enable of the ODUflex using the TS1, the TS3, and the TS4, data enable of the ODU0 using the TS2, data enable of the ODU1 using the TS5 and the TS7, and data enable of the ODU0 using the TS6 are generated and output. The overhead detector 53 includes FAS detectors 63a through 63h, overhead positional information counters 64a through 64h, and overhead byte extractors 65a through 65h.

The 64-bit data output from the data rearranger 51 supplied to the FAS detectors 63a through 63h. Further, the data enable of the ODUflex (TS1, TS3, and TS4) output from the data rearranger 51 is supplied to the FAS detector 63a.

The data enable of the ODU0 (TS2) output from the data rearranger 51 is supplied to the FAS detector 63b. The data enable of the ODU1 (TS5 and TS7) output from the data rearranger 51 is supplied to the FAS detector 63c. The data enable of the ODU0 (TS6) is supplied to the FAS detector 63d.

The FAS detectors 63a through 63h detect a fixed pattern 0xF6, 0xF6, 0xF6, 0x28, 0x28, and 0x28 of the FAS and supply a detection signal to the overhead positional information counters 64a through 64h. The overhead positional information counters 64a through 64h count the clocks after the FAS detection, generate information indicating the overhead position, and supply the information to the overhead byte extractors 65a through 65h.

The overhead byte extractors 65a through 65h extract the overhead part and supply the extracted overhead part to the monitor 54. There are eight circuits each including the FAS detector, the overhead positional information counter, and the overhead byte extractor. The reason of providing the eight circuits is to respond to a case where all the TS1 through TS8 use the ODU0.

Configuration of Data Rearranger

Figure 12:
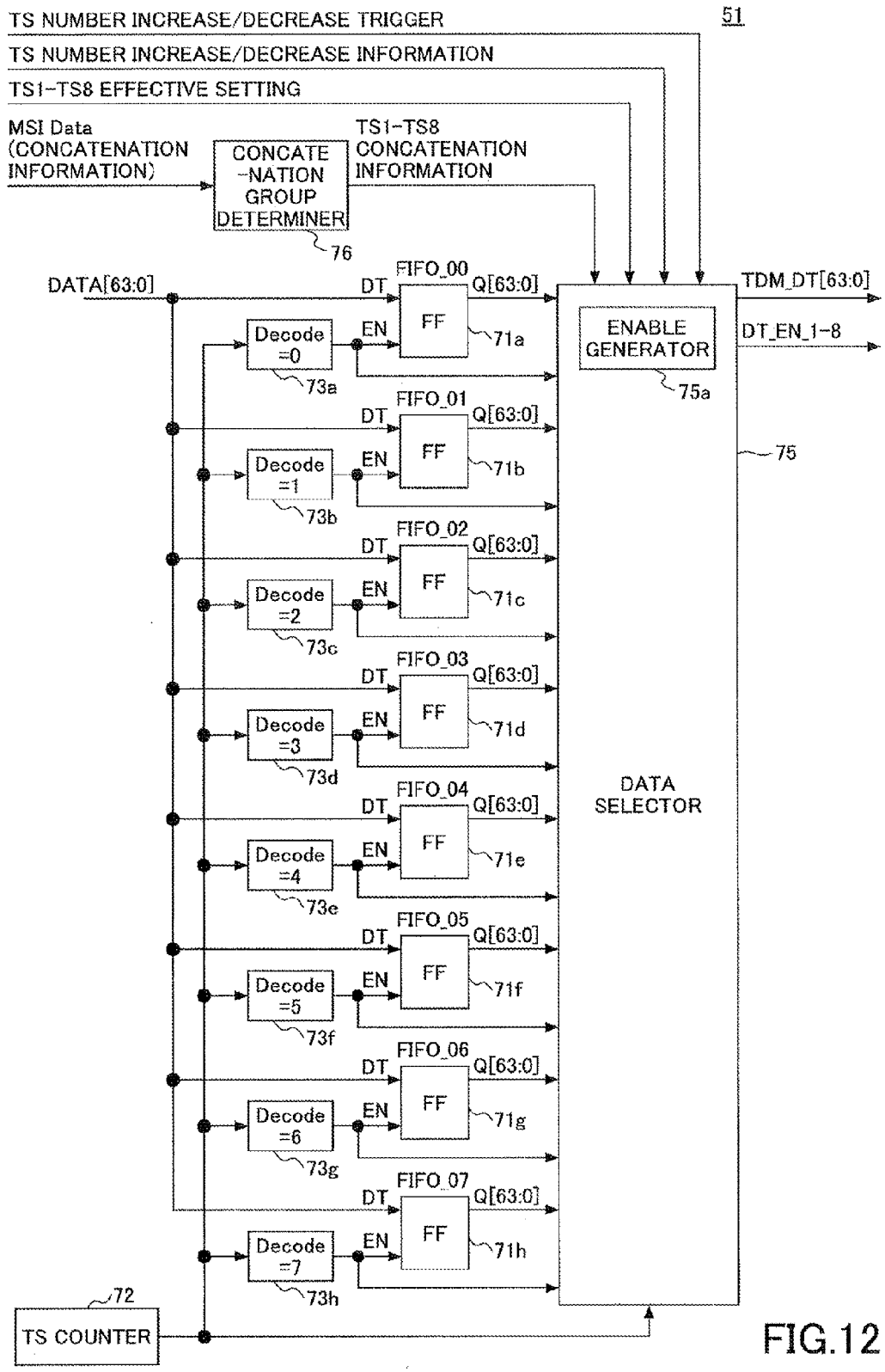
FIG. 12 illustrates an example of data and the converter according to an embodiment.

FIG. 12 illustrates an example configuration of the data rearranger 51 according to an embodiment. As illustrated in FIG. 12, the 64-bit data, the TS1 [63:56] through the TS8 [7:0], are supplied to FIFOs 71a through 71h. A TS counter 72 is an octal counter that counts the clock and outputs a counter value from "0" to "7".

The counter value of the TS counter 72 is supplied to decoders 73a through 73h and a data selector 75. The decoder 73a generates an enable signal when the counter value is "0", and supplies the enable signal to the FIFO 71a and the data selector 75.

The decoder 73b generates an enable signal when the counter value is "1", and supplies the enable signal to the FIFO 71b and the data selector 75. The decoder 73c generates an enable signal when the counter value is "2", and supplies the enable signal to the FIFO 71c and the data selector 75.

The decoder 73d generates an enable signal when the counter value is "3", and supplies the enable signal to the FIFO 71d and the data selector 75. The decoder 73e generates an enable signal when the counter value is "4", and supplies the enable signal to the FIFO 71e and the data selector 75.

The decoder 73f generates an enable signal when the counter value is "5", and supplies the enable signal to the FIFO 71f and the data selector 75. The decoder 73g generates an enable signal when the counter value is "6", and supplies the enable signal to the FIFO 71g and the data selector 75. The decoder 73h generates an enable signal when the counter value is "7", and supplies the enable signal to the FIFO 71h and the data selector 75.

Upon receiving the enable signals from the decoders 73a through 73h, the respective FIFOs 71a through 71h latch the 64-bit data, the TS1 [63:56] through the TS8 [7:0], and supplies the 64-bit data to the data selector 75.

Further, a TS number increase/decrease trigger signal, a TS number increase/decrease signal, and a TS1-TS8 enable setting signal are supplied to the data selector 75. MSI data corresponding to the concatenation information are supplied to a concatenation group determiner 76.

Based on the MSI data, the concatenation group determiner 76 generates the concatenation information corresponding to each of the TS1 through the TS8. The concatenation information is supplied to the data selector 75.

Further, in the concatenation information corresponding to the signal at the transmission rate of the ODU2 illustrated in FIG. 11A, the TS1, the TS3, and the TS4 constitute the concatenation group of the ODUflex, and the TS5 and the TS7 constitute the concatenation group of the ODU1.

Further, the TS number increase/decrease trigger signal, the TS number increase/decrease signal, the TS1-TS8 enable setting signal, and the concatenation information are supplied from a controller (not shown) included in a data transmission apparatus such as the ADM apparatus as illustrated in FIG. 2.

Figure 13A:
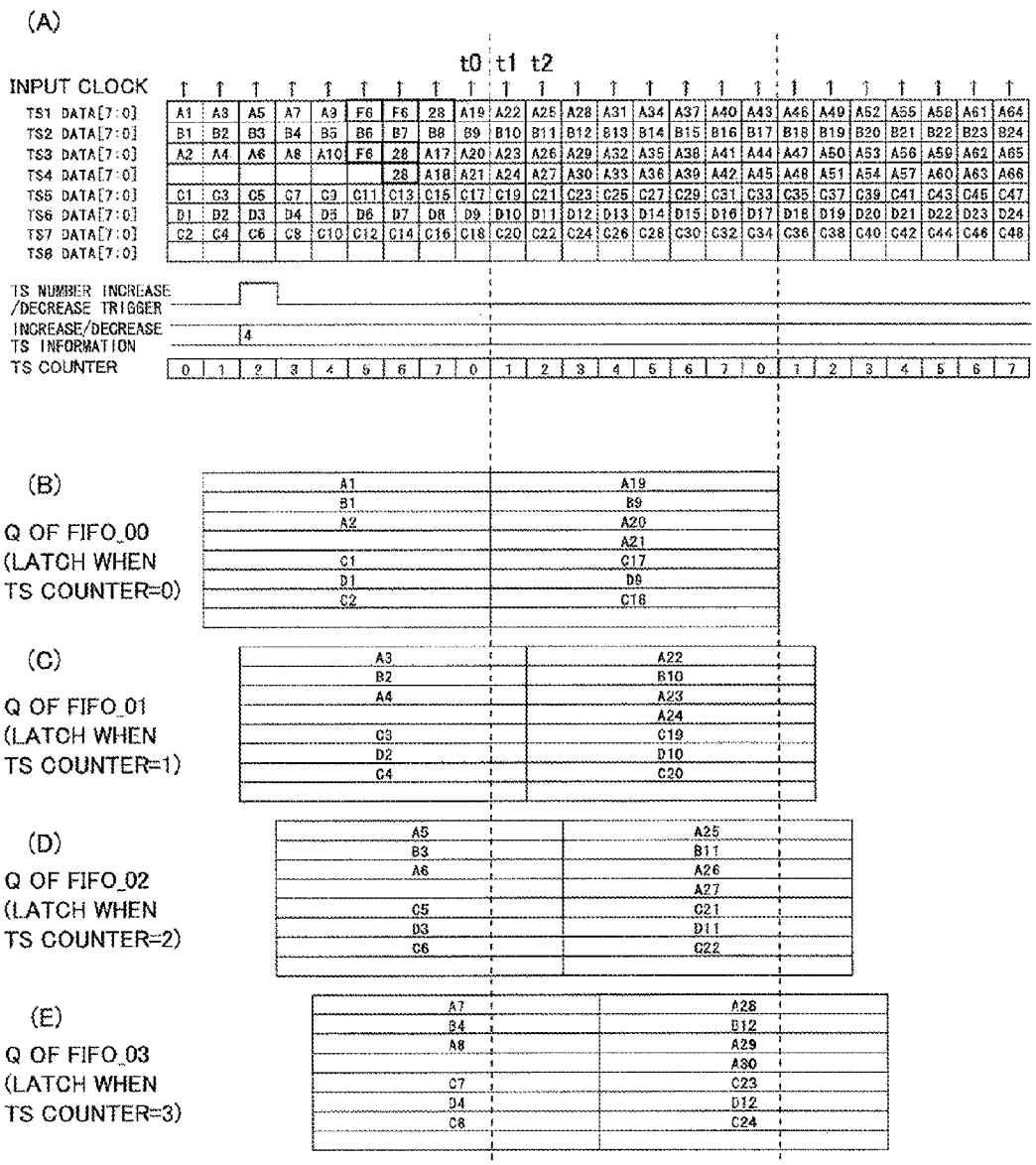
FIG. 13A is an example signal timing chart of the operations of the data and the converter.

Part (A) of FIG. 13A exemplarily illustrates signals at the transmission rate of the ODU2 and the counter values of the TS counter 72. Specifically, in part (A) of FIG. 13A, the counter values are added to the drawing in FIG. 11A.

Part (B) of FIG. 13A illustrates latch data to be supplied from the FIFO 71a to the data selector 75. Part (C) of FIG. 13A illustrates latch data to be supplied from the FIFO 71b to the data selector 75.

Part (D) of FIG. 13A illustrates latch data to be supplied from the FIFO 71c to the data selector 75. Part (E) of FIG. 13A illustrates latch data to be supplied from the FIFO 71d to the data selector 75.

Figure 13B:
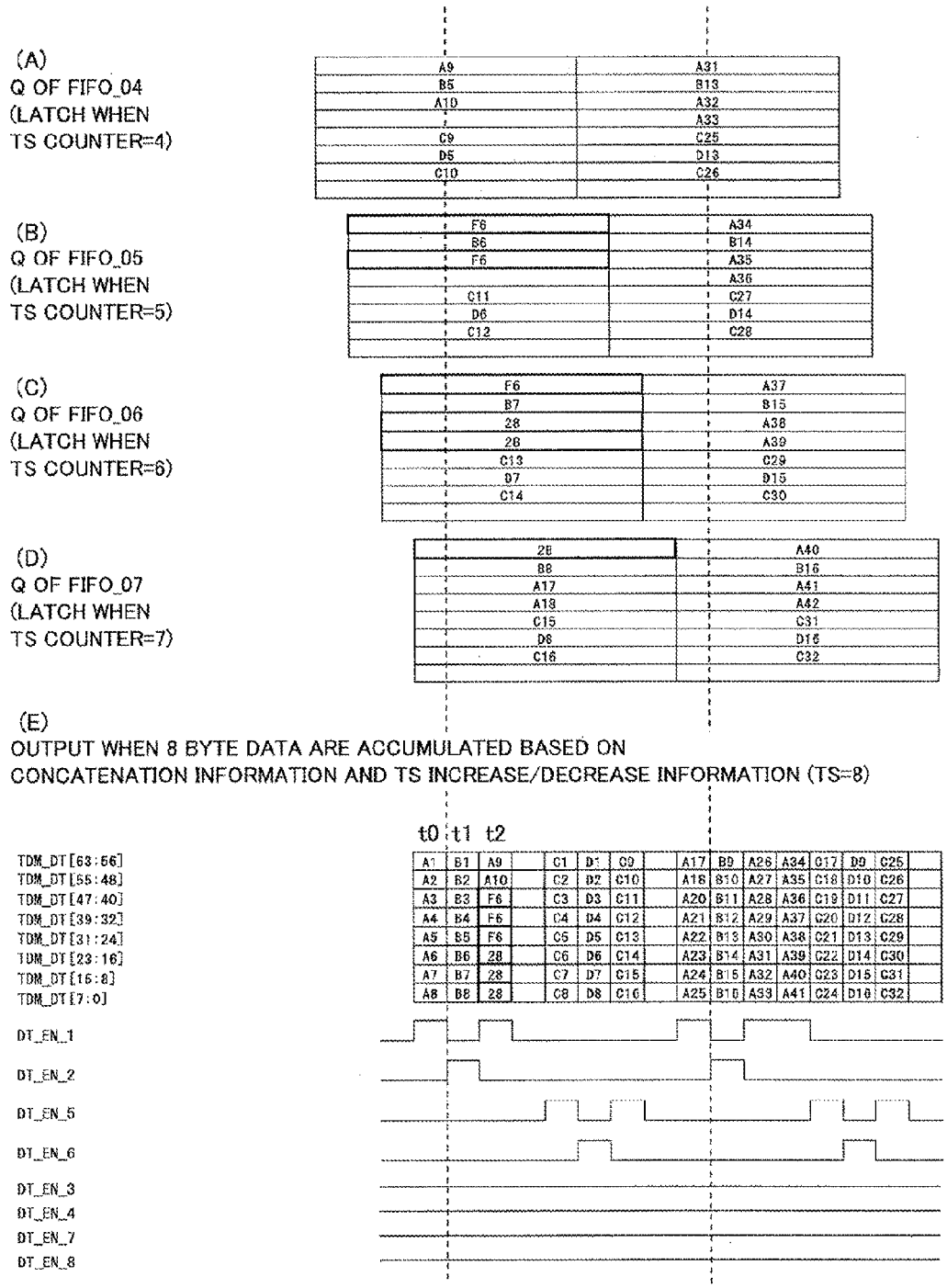
FIG. 13B is another example signal timing chart of the operations of the data and the converter.

Further, part (A) of FIG. 13B illustrates latch data to be supplied from the FIFO 71e to the data selector 75. Part (B) of FIG. 13B illustrates latch data to be supplied from the FIFO 71f to the data selector 75.

Part (C) of FIG. 13B illustrates latch data to be supplied from the FIFO 71g to the data selector 75. Part (D) of FIG. 13B illustrates latch data to be supplied from the FIFO 71h to the data selector 75.

Based on the above inputs, the data selector 75 generates rearranged data TDM_DT [63:0] and data enable signals DT_EN_1 through DT_EN_8 as illustrated in part (E) of FIG. 13B.

Enable Generator

Figure 14:
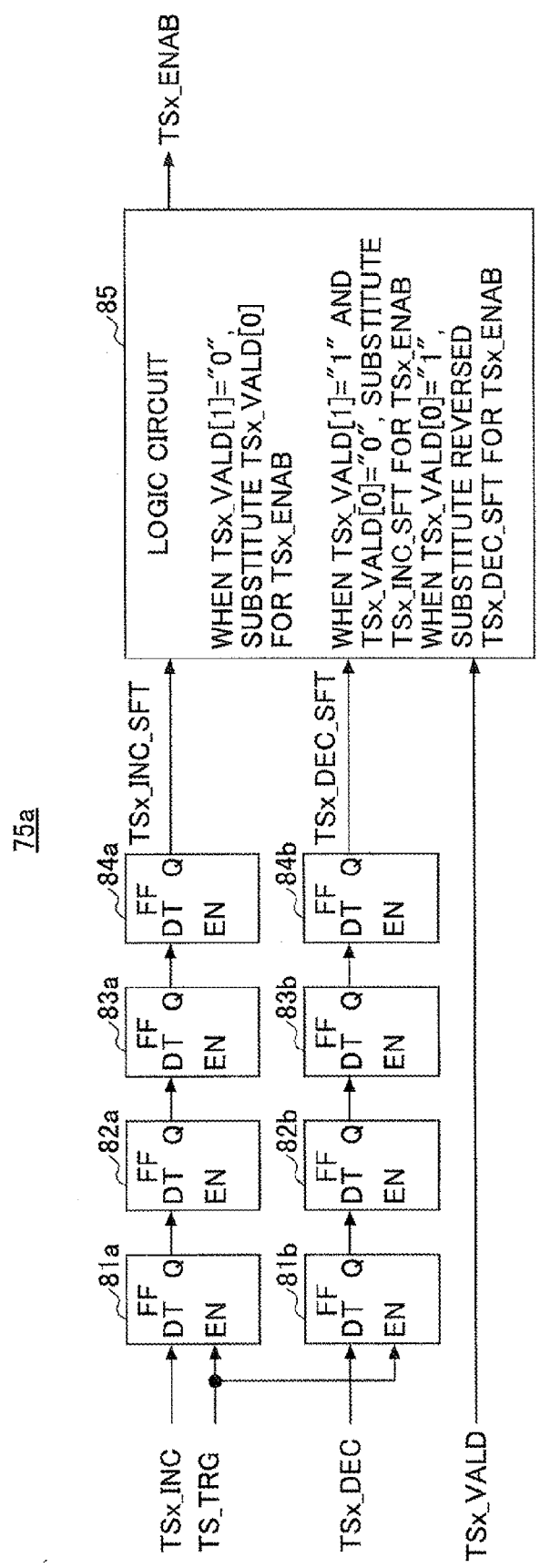
FIG. 14 is an example configuration of an enable generator.

FIG. 14 illustrates an example configuration of an enable generator 75a included in the data selector 75. The enable generator is provided for each of the TS1 through the TS8. In FIG. 14, the "TSx_INC (x: an integer from 1 to 8)" denotes a signal indicating a value "1" as the increase of the TSx in the ODUflex.

The "TS_TSR" is the TS number increase/decrease trigger which triggers with a value "1". The "TSx_INC" is set to a flip-flop 81a when the TS number increase/decrease trigger "TS_TSR" indicates a value "1", and is shifted through the flip-flops 81a through 84a upon a clock input to be supplied to a logic circuit 85 as the "TSx_INC_SET".

The "TSx_DEC" denotes a signal indicating a value "1" as the decrease of the TSx in the ODUflex. The "TSx_DEC" is set to a flip-flop 81b when the TS number increase/decrease trigger "TS_TSR" indicates a value "1", and is shifted through the flip-flops 81b through 84b upon a clock input to be supplied to the logic circuit 85 as the "TSx_DEC_SET".

In this embodiment, as described above, after four clocks since the input of the TS switching signal, the TS4 designated by the TS increase setting is additionally used. Therefore, four steps of the flip-flops 81a through 84a or the flip-flops 81b through 84b are provided. However, the present invention is not limited to this configuration.

Further, the concatenation information TSx_VALD [1:0] has two-bit data. When indicating that the first bit TSx_VALD [1]=1, the concatenation information indicates the ODUflex or the ODU1. On the other hand, when indicating that the first bit TSx_VALD [1]=0, the concatenation information indicates none of the ODUflex and the ODU1 (i.e., there is no concatenation group).

When indicating that the second bit TSx_VALD [0]=1, the concatenation information indicates the use of the TSx. On the other hand, when indicating that the second bit TSx_VALD [0]=0, the concatenation information indicates no use of the TSx. The TSx_VALD [1:0] is supplied to the logic circuit 85.

When indicating that TSx_VALD [1]=0, the logic circuit 85 sets the TSx_VALD [0] to the enable signal TSx_ENAB and outputs the enable signal TSx_ENAB. When indicating that TSx_VALD [1]=1 and TSx_VALD [0]=0, the logic circuit 85 sets the TSx_INC_SET to the enable signal TSx_ENAB and outputs the enable signal TSx_ENAB.

Further, when indicating that TSx_VALD [1]=1 and TSx_VALD [0]=1, the logic circuit 85 inverses the TSx_DEC_SET, sets the inversed TSx_DEC_SET to the enable signal TSx_ENAB, and outputs the enable signal TSx_ENAB.

Operations of Data Selector

Figure 15B:
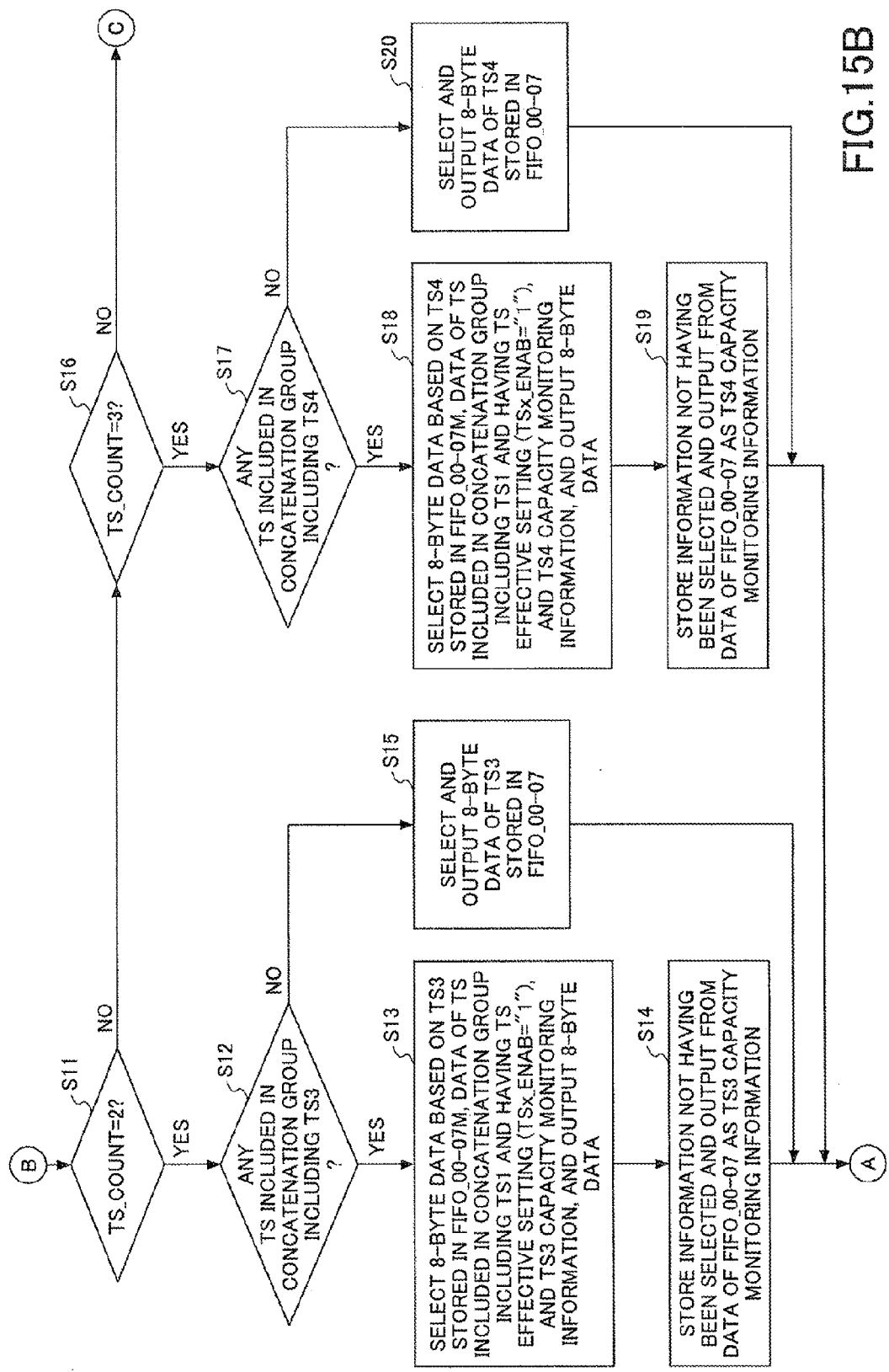

FIGS. 15A through 15D collectively indicate a flowchart of the operations of the data selector 75. In FIG. 15A, in step S1, the data selector 75 determines whether the counter value "TS_COUNT" of the TS counter 72 is "0". When determining that TS_COUNT=0, the process goes to step S2. In step S2, based on the concatenation information of the TS1 through the TS8, the data elector 75 determines whether there is any TS number(s) that is other than TS1 and that is included in the concatenation group including the TS1.

When determining that there is any TS number(s) that is other than TS1 and that is included in the concatenation group including the TS1, the process goes to step S3. In step S3, the data selector 75 selects 8-byte data based on the TS1 stored in the FIFOs 71a through 71h, the data of the TS number(s) included in the concatenation group including the TS1 and having the enable signal TSx_ENAB=1, and TSi capacity monitoring information, and outputs the 8-byte data as rearranged data TDM_DT [63:0] along with "data enable "DT_EN_i"" having a value "1".

The "i" herein denotes the minimum TS number in the concatenation group. The TSi capacity monitoring information stores the TS1 and the data of other TS number(s) in the concatenation group including the TS1, the data not having been output before. Therefore, the data of the TSi capacity monitoring information are (to be) preferentially selected to be output.

Next, in step S4, the TS1 and the data of the other TS number(s) included in the concatenation group including the TS1 and not having been selected and output before are stored as the TSi capacity monitoring information.

On the other hand, when determining that there is no TS number included in the concatenation group including the TS1, the process goes to step S5. In step S5, the data selector 75 selects 8-byte data of the TS1 stored in the FIFOs 71a through 71h, and outputs as the rearranged data TDM_DT [63:0] along with data enable DT_EN_1 having a value "1". After steps S4 and S5, the process goes back to step S1.

In step S1, when determining that the counter value of the TS_counter is other than "0", the process goes to step S6. In step S6, the data selector 75 determines whether the counter value TS_COUNT of the TS counter 72 is "1".

When determining that TS_counter=1, the process goes to step S7. In step S7, based on the concatenation information of the TS1 through the TS8, the data selector 75 determines whether there is any TS number(s) that is other than TS2 and that is included in the concatenation group including the TS2.

When determining that there is any TS number(s) that is other than TS2 and that is included in the concatenation group including the TS2, the process goes to step S8. In step S8, the data selector 75 selects 8-byte data based on the TS2 stored in the FIFOs 71a through 71h, the data of the TS number(s) included in the concatenation group including the TS1 and having the enable signal TSx_ENAB=1, and the TSi capacity monitoring information, and outputs the 8-byte data as rearranged data TDM_DT [63:0] along with the "data enable "DT_EN_i"" having a value "1".

The "i" herein denotes the minimum TS number in the concatenation group. The TSi capacity monitoring information stores the TS2 and other TS number(s) included in the concatenation group including the TS2, the data not having been output before. Therefore, the data of the TSi capacity monitoring information are preferentially selected to be output. Next, in step S9, the TS2 and the data of the TS number(s) included in the concatenation group including the TS2 and not having been selected and output before are stored as the TSi capacity monitoring information.

On the other hand, when determining that there is no TS number included in the concatenation group including the TS2, the process goes to step S10. In step S10, the data selector 75 selects 8-byte data of the TS2 stored in the FIFOs 71a through 71h, and outputs as the rearranged data TDM_DT [63:0] along with data enable DT_EN_2 having a value "1". After steps S9 and S10, the process goes back to step S1.

In step S6, when determining that the counter value of the TS_counter is other than "1", the process goes to step S11 of FIG. 15B. In step S11, the data selector 75 determines whether the counter value TS_COUNT of the TS_counter 72 is "2". When determining that TS_counter=2, the process goes to step S12.

In step S12, based on the concatenation information of the TS1 through the TS8, the data selector 75 determines whether there is any TS number(s) that is other than TS3 and that is included in the concatenation group including the TS3.

When determining that there is any TS number(s) that is other than TS3 and that is included in the concatenation group including the TS3, the process goes to step S13. In step S13, the data selector 75 selects 8-byte data based on the TS3 stored in the FIFOs 71a through 71h, the data of the TS number(s) included in the concatenation group including the TS3 and having the enable signal TSx_ENAB=1, and the TSi capacity monitoring information, and outputs the 8-byte data as the rearranged data TDM_DT [63:0] along with the "data enable "DT_EN_i"" having a value "1".

The "i" herein denotes the minimum TS number in the concatenation group. The TSi capacity monitoring information stores the TS3 or the data of the TS number(s) included in the concatenation group including the TS3, the TS3 or the data not having been output before. Therefore, the data of the TSi capacity monitoring information are preferentially selected to be output.

Next, in step S14, the TS3 and the data of the TS number(s) included in the concatenation group including the TS3 and not having been selected and output before are stored as the TSi capacity monitoring information.

On the other hand, when determining that there is no TS number included in the concatenation group including the TS3, the process goes to step S15. In step S15, the data selector 75 selects 8-byte data of the TS3 stored in the FIFOs 71a through 71h, and outputs as the rearranged data TDM_DT [63:0] along with "data enable "DT_EN_3"" having a value "1". After steps S14 and S15, the process goes back to step S1.

In step S11, when determining that the counter value of the TS_counter is other than "2", the process goes to step S16. In step S16, the data selector 75 determines whether the counter value TS_COUNT of the TS counter 72 is "3". When determining that TS_counter=3, the process goes to step S17.

In step S17, based on the concatenation information of the TS1 through the TS8, the data selector 75 determines whether there is any TS number(s) that is other than TS4 and that is included in the concatenation group including the TS4.

When determining that there is any TS number(s) that is other than TS4 and that is included in the concatenation group including the TS4, the process goes to step S18. In step S18, the data selector 75 selects 8-byte data based on the TS4 stored in the FIFOs 71a through 71h, the data of the TS number(s) included in the concatenation group including the TS4 and having the enable signal TSx_ENAB=1, and the TSi capacity monitoring information, and outputs the 8-byte data as the rearranged data TDM_DT [63:0] along with the "data enable "DT_EN_i"" having a value "1".

The "i" herein denotes the minimum TS number in the concatenation group. The TSi capacity monitoring information stores the TS4 or the data of the TS number(s) included in the concatenation group including the TS4, the TS4 or the data not having been output before. Therefore, the data of the TSi capacity monitoring information are preferentially selected to be output.

Next, in step S19, the TS4 and the data of the TS number(s) included in the concatenation group including the TS4 and not having been selected and output before are stored as the TSi capacity monitoring information.

On the other hand, when determining that there is no TS number included in the concatenation group including the TS4, the process goes to step S20. In step S20, the data selector 75 selects 8-byte data of the TS4 stored in the FIFOs 71a through 71h, and outputs as the rearranged data TDM_DT [63:0] along with "data enable "DT_EN_4"" having a value "1". After steps S19 and S20, the process goes back to step S1.

Figure 15C:
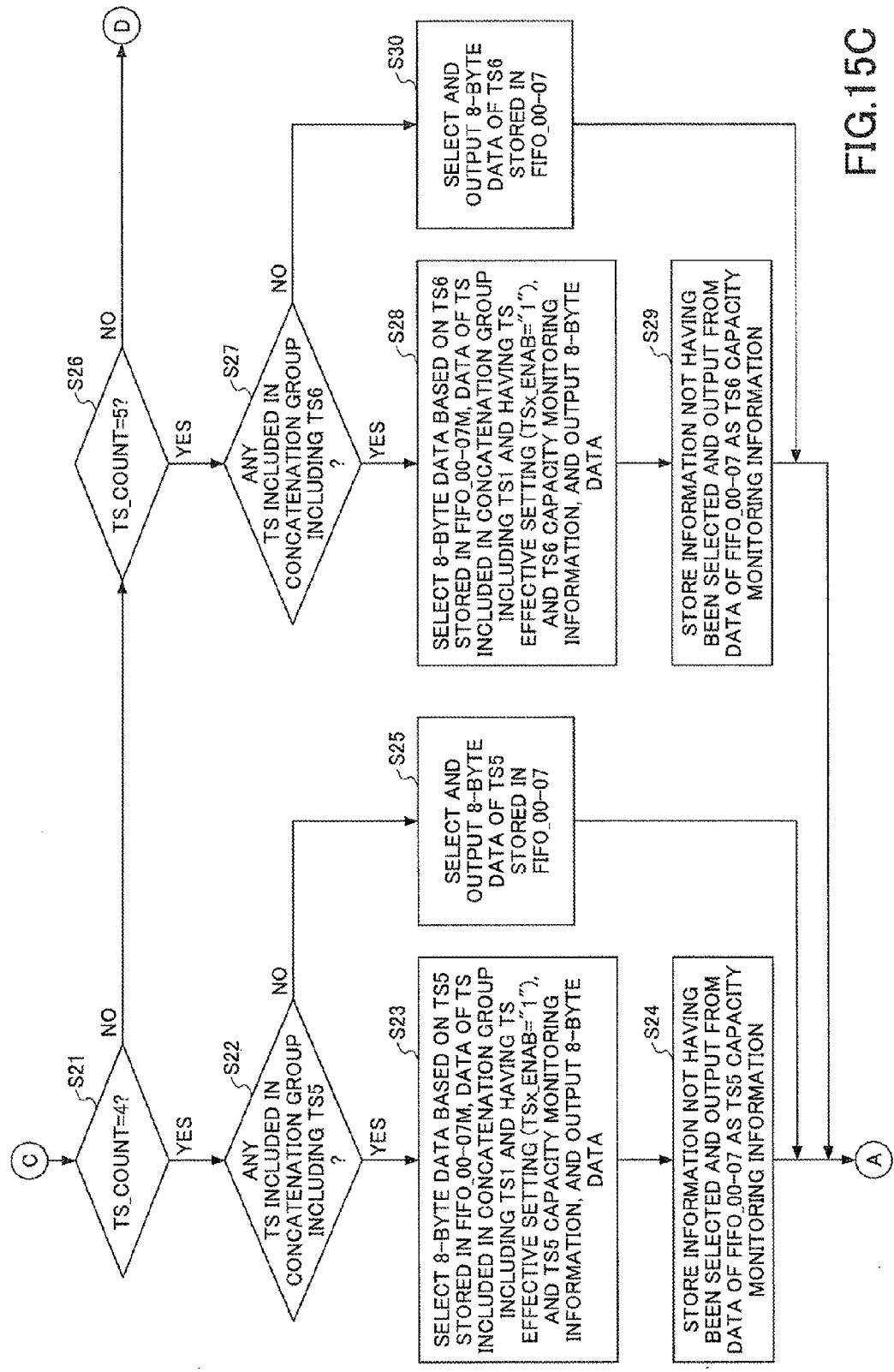

In step S16, when determining that the counter value of the TS_counter is other than "3", the process goes to step S21 in FIG. 15C. In step S21, the data selector 75 determines whether the counter value TS_COUNT of the TS counter 72 is "4".

When determining that TS_counter=4, the process goes to step S22. In step S22, based on the concatenation information of the TS1 through the TS8, the data selector 75 determines whether there is any TS number(s) that is other than TS5 and that is included in the concatenation group including the TS5.

When determining that there is any TS number(s) that is other than TS5 and that is included in the concatenation group including the TS5, the process goes to step S23. In step S23, the data selector 75 selects 8-byte data based on the TS5 stored in the FIFOs 71a through 71h, the data of the TS number(s) included in the concatenation group including the TS5 and having the enable signal TSx_ENAB=1, and the TSi capacity monitoring information, and outputs the 8-byte data as the rearranged data TDM_DT [63:0] along with the "data enable "DT_EN_i"" having a value "1".

The "i" herein denotes the minimum TS number in the concatenation group. The TSi capacity monitoring information stores the TS5 or the data of the TS number(s) included in the concatenation group including the TS5, the TS4 or the data not having been output before. Therefore, the data of the TSi capacity monitoring information are preferentially selected to be output.

Next, in step S24, the TS5 and the data of the TS number(s) included in the concatenation group including the TS5 and not having been selected and output before are stored as the TSi capacity monitoring information.

On the other hand, when determining that there is no TS number included in the concatenation group including the TS5, the process goes to step S25. In step S25, the data selector 75 selects 8-byte data of the TS5 stored in the FIFOs 71a through 71h, and outputs as the rearranged data TDM_DT [63:0] along with "data enable "DT_EN_5"" having a value "1". After steps S24 and S25, the process goes back to step S1.

In step S21, when determining that the counter value of the TS_counter is other than "4", the process goes to step S26. In step S26, the data selector 75 determines whether the counter value TS_COUNT of the TS counter 72 is "5".

When determining that TS_counter=5, the process goes to step S27. In step S27, based on the concatenation information of the TS1 through the TS8, the data selector 75 determines whether there is any TS number(s) that is other than TS6 and that is included in the concatenation group including the TS6.

When determining that there is any TS number(s) that is other than TS6 and that is included in the concatenation group including the TS6, the process goes to step S28. In step S28, the data selector 75 selects 8-byte data based on the TS6 stored in the FIFOs 71a through 71h, the data of the TS number(s) included in the concatenation group including the TS6 and having the enable signal TSx_ENAB=1, and the TSi capacity monitoring information, and outputs the 8-byte data as the rearranged data TDM DT [63:0] along with the "data enable "DT_EN_i"" having a value "1".

The "i" herein denotes the minimum TS number in the concatenation group. The TSi capacity monitoring information stores the TS6 or the data of the TS number(s) included in the concatenation group including the TS6, the TS6 or the data not having been output before. Therefore, the data of the TSi capacity monitoring information are preferentially selected to be output.

Next, in step S29, the TS6 and the data of the TS number(s) included in the concatenation group including the TS6 and not having been selected and output before are stored as the TSi capacity monitoring information.

On the other hand, when determining that there is no TS number included in the concatenation group including the TS6, the process goes to step S30. In step S30, the data selector 75 selects 8-byte data of the TS6 stored in the FIFOs 71a through 71h, and outputs as the rearranged data TDM_DT [63:0] along with "data enable "DT_EN_6"" having a value "1". After steps S29 and S30, the process goes back to step S1.

In step S26, when determining that the counter value of the TS_counter is other than "5", the process goes to step S31. In step S31, the data selector 75 determines whether the counter value TS_COUNT of the TS counter 72 is "6". When determining that TS_counter=6, the process goes to step S32.

In step S32, based on the concatenation information of the TS1 through the TS8, the data selector 75 determines whether there is any TS number(s) that is other than TS7 and that is included in the concatenation group including the TS7.

When determining that there is any TS number(s) that is other than TS7 and that is included in the concatenation group including the TS7, the process goes to step S33. In step S33, the data selector 75 selects 8-byte data based on the TS7 stored in the FIFOs 71a through 71h, the data of the TS number(s) included in the concatenation group including the TS7 and having the enable signal TSx_ENAB=1, and the TSi capacity monitoring information, and outputs the 8-byte data as the rearranged data TDM_DT [63:0] along with the "data enable "DT_EN_i"" having a value "1".

The "i" herein denotes the minimum TS number in the concatenation group. The TSi capacity monitoring information stores the TS7 or the data of the TS number(s) included in the concatenation group including the TS7, the TS7 or the data not having been output before.

Therefore, the data of the TSi capacity monitoring information are preferentially selected to be output. Next, in step S34, the TS7 and the data of the TS number(s) included in the concatenation group including the TS7 and not having been selected and output before are stored as the TSi capacity monitoring information.

On the other hand, when determining that there is no TS number included in the concatenation group including the TS7, the process goes to step S35. In step S35, the data selector 75 selects 8-byte data of the TS7 stored in the FIFOs 71a through 71h, and outputs as the rearranged data TDM_DT [63:0] along with "data enable "DT_EN_7"" having a value "1". After steps S34 and S35, the process goes back to step S1.

In step S31, when determining that the counter value of the TS_counter is other than "6", the process goes to step S36. In step S36, the data selector 75 determines whether the counter value TS_COUNT of the TS counter 72 is "7".

When determining that TS_counter=7, the process goes to step S37. In step S37, based on the concatenation information of the TS1 through the TS8, the data selector 75 determines whether there is any TS number(s) that is other than TS8 and that is included in the concatenation group including the TS8.

When determining that there is any TS number(s) that is other than TS8 and that is included in the concatenation group including the TS8, the process goes to step S38. In step S38, the data selector 75 selects 8-byte data based on the TS8 stored in the FIFOs 71a through 71h, the data of the TS number(s) included in the concatenation group including the TS8 and having the enable signal TSx_ENAB=1, and the TSi capacity monitoring information, and outputs the 8-byte data as the rearranged data TDM_DT [63:0] along with the "data enable "DT_EN_i"" having a value "1".

The "i" herein denotes the minimum TS number in the concatenation group. The TSi capacity monitoring information stores the TS8 or the data of the TS number(s) included in the concatenation group including the TS8, the TS8 or the data not having been output before.

Therefore, the data of the TSi capacity monitoring information are preferentially selected to be output. Next, in step S39, the TS8 and the data of the TS number(s) included in the concatenation group including the TS8 and not having been selected and output before are stored as the TSi capacity monitoring information.

On the other hand, when determining that there is no TS number included in the concatenation group including the TS8, the process goes to step S40. In step 540, the data selector 75 selects 8-byte data of the TS8 stored in the FIFOs 71a through 71h, and outputs as the rearranged data TDM_DT [63:0] along with "data enable "DT_EN 8"" having a value "1". After steps S39 and S40, the process goes back to step S1.

At timing "t0" in FIGS. 13A and 13B, the processes of steps S3 and S4 are executed. By executing the processes, the data A1 through A8 in the first row (TS1) and the third row (TS3) illustrated in the parts (B) through (E) of FIG. 13A are selected by the data selector 75.

Then, as illustrated in the part (E) of FIG. 13B, the data A1 thorough A8 along with the "data enable "DT_EN_1"" having a value "1" are output. In this case, the data A9, A10, 0xF6, 0xF6, 0xF6, 0x28, 0x28, and 0x28 in the first row (TS1) and the third row (TS3) in the parts (A) through (D) of FIG. 13A are stored as (in) the TSi capacity monitoring information (i=1).

At timing "t1", the process of step S10 is executed. By executing the process, the data B1 through B8 in the second row (TS2) illustrated in the parts (B) through (E) of FIG. 13A are selected by the data selector 75. Then, as illustrated in the part (E) of FIG. 13B, the data B1 thorough B8 along with the "data enable "DT_EN_2"" having a value "1" are output.

At timing "t2", the processes of steps S13 and S14 are executed. By executing the processes, the data A9, A10, 0xF6, 0xF6, 0xF6, 0x28, 0x28, and 0x28 in the first row (TS1) in the concatenation group including the TS1 and stored in the TSi capacity monitoring information are output along with the "data enable "DT_EN_1"" having a value "1". Further, the data A17 through A21 are stored as the TSi capacity monitoring information (i=1).

In the case of the ODU2, eight overhead detectors may be used to carry out the embodiment described above. On the other hand, according to related art, twenty overhead detectors may become necessary in the case of the ODU2.

Therefore, according to an embodiment, it may become possible to reduce the number of the overhead detectors. Although the data rearranger 51 is used in the embodiment, the circuit scale and the energy consumption may be reduced by approximately 30% when compared with those in related art.

In a case of the ODU4, according to an embodiment, the data rearranger 51 may include 80 circuits, each of the circuits including a 640-bit FIFO and decoder, and the data selector 75 outputs 640-bit data and 80 data enable signals. However, besides the above, the configuration and the operations in the case of the ODU4 are substantially the same as those in the case of the ODU2.

In related art, 369 overhead detectors may become necessary in the case of ODU4, while, again, 80 overhead detectors may be sufficient according to the embodiment. Therefore, the efficiency of the present invention may further be improved in the case of ODU4 when compared with the case of the ODU2. Specifically, in the case of the ODU4 according to the embodiment, the circuit scale and the energy consumption may be reduced by approximately 50% when compared with those in related art.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of superiority or inferiority of the invention. Although the embodiment of the present inventions has been described in detail, it is to be understood that various changes, substitutions, and alterations could be made hereto without departing from the spirit and scope of the invention.

What is claimed is:

1. A data transmission device for a network, comprising:
a plurality of storage units configured to store signal data items of time slots of a high-speed signal transmission frame on a time slot number basis in accordance with a number of the time slots, the time slots being identified by respective time slot numbers, and the signal data items being supplied to the plurality of storage units on the time slot number basis, wherein low-speed signal transmission frames are included in the high-speed signal transmission frame time slots, and the number of the time slots to include the low-speed signal transmission frames is variable;
a data selector configured to select and sequentially output the signal data items from the plurality of storage units on the time slot number basis, the signal data items having been stored in the plurality of storage units in accordance with the number of the time slots; and
an overhead detector configured to be supplied with the signal data items corresponding to the number of the time slots, output from the data selector on the time slot number basis, and detect an overhead of each of the low-speed signal transmission frames on the time slot number basis,
wherein the data selector is configured to output data enable signals, indicating that the signal data items are enabled, in units of the low-speed signal transmission frames included in the high-speed signal transmission frame time slots, concurrent with the outputting the signal data items from the plurality of storage units on the time slot number basis.

2. The data transmission device according to claim 1, further comprising:
a counter configured to count the number of the time slots of the high-speed signal transmission frame using the number of the time slots as a unit,
wherein each of the signal data items is stored into one of the plurality of storage units of the time slot number corresponding to a counter value of the counter, and
wherein the data selector is configured to select one of the signal data items of the time slot number corresponding to the counter value from the counter, and output the selected signal data item.

3. The data transmission device according to claim 2, wherein the data selector is configured to output, when the low-speed signal transmission frames are included in the time slots included in a concatenation group, one of the data enable signals corresponding to one of the time slot numbers of the time slots included in the concatenation group.

4. A data transmission method for a network, comprising:
storing signal data items of time slots of a high-speed signal transmission frame into a plurality of storage units on a time slot number basis in accordance with a number of the time slots, the time slots being identified by respective time slot numbers, and the signal data items being supplied to the plurality of storage units on the time slot number basis, wherein low-speed signal transmission frames are included in the high-speed signal transmission frame time slots, and the number of the time slots to include the low-speed signal transmission frames is variable;

selecting and sequentially outputting the signal data items from the plurality of storage units on the time slot number basis, the signal data items having been stored in the plurality of storage units in accordance with the number of the time slots; and supplying to an overhead detector the signal data items corresponding to the number of the time slots, output from a data selector on the time slot number basis, and detecting by the overhead detector an overhead of each of the low-speed signal transmission frames on the time slot number basis, wherein the selecting and sequentially outputting includes outputting data enable signals, indicating that the signal data items are enabled, in units of the low-speed signal transmission frames included in the high-speed signal transmission frame time slots, concurrent with the outputting the signal data items from the plurality of storage units on the time slot number basis.

5. The data transmission method according to claim 4, further comprising:
counting, by a counter, the number of the time slots of the high-speed signal transmission frame by the time slot capacity, wherein, in the storing, each of the signal data items is stored into one of the plurality of storage units of the time slot number corresponding to a counter value of the counter, and wherein, in the selecting and sequentially outputting, one of the signal data items of the time slot number corresponding to the counter value from the counter is selected, and the selected signal data item is output.

6. The data transmission method according to claim 5,
wherein, in the selecting and sequentially outputting, when the low-speed signal transmission frames are included in the time slots included in a concatenation group, one of the data enable signals is output corresponding to one of the time slot numbers of the time slots included in the concatenation group.

* * * * *